United States Patent
Li et al.

(10) Patent No.: US 7,686,331 B2
(45) Date of Patent: Mar. 30, 2010

(54) FABRICS, AIRBAGS AND METHODS

(75) Inventors: Shulong Li, Spartanburg, SC (US); Derek L. Bowen, LaGrange, GA (US); Charles E. Willbanks, Spartanburg, SC (US); Ramesh Keshavaraj, Peachtree City, GA (US); David D. Hildreth, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 448 days.

(21) Appl. No.: 10/950,974

(22) Filed: Sep. 27, 2004

(65) Prior Publication Data

US 2007/0237961 A1    Oct. 11, 2007

Related U.S. Application Data

(63) Continuation of application No. 09/942,133, filed on Aug. 29, 2001, now abandoned.

(60) Provisional application No. 60/229,112, filed on Aug. 30, 2000.

(51) Int. Cl.
*B60R 21/235* (2006.01)

(52) U.S. Cl. .................. 280/743.1; 442/164

(58) Field of Classification Search ............ 442/76; 280/728.1
See application file for complete search history.

(56) References Cited

U.S. PATENT DOCUMENTS

| | | | |
|---|---|---|---|
| 3,792,873 A | 2/1974 | Buchner et al. | 280/150 |
| 4,921,735 A | 5/1990 | Bloch | 428/34.9 |
| 4,944,529 A | 7/1990 | Backhaus | 280/743 |
| 4,977,016 A | 12/1990 | Thornton et al. | 428/225 |
| 5,011,183 A | 4/1991 | Thornton et al. | 280/743 |
| 5,073,418 A | 12/1991 | Thornton et al. | 428/34.9 |
| 5,087,071 A | 2/1992 | Wallner et al. | 280/743 |
| 5,090,729 A | 2/1992 | Watanabe | 280/743 |
| 5,093,163 A | 3/1992 | Krummheuer et al. | 428/35.1 |
| 5,110,666 A | 5/1992 | Menzel et al. | 428/196 |
| 5,236,775 A | 8/1993 | Swoboda et al. | 428/225 |
| 5,277,230 A | 1/1994 | Sollars, Jr. | 139/389 |
| 5,310,216 A | 5/1994 | Wehner et al. | 280/743 |
| 5,316,337 A | 5/1994 | Yamaji et al. | 280/743 |
| 5,356,680 A | 10/1994 | Krummheuer et al. | 428/36.1 |
| 5,421,378 A | 6/1995 | Bowers et al. | 139/435.1 |
| 5,423,273 A | 6/1995 | Hawthorn et al. | 112/441 |
| 5,454,594 A | 10/1995 | Krickl | 280/743.1 |
| 5,477,890 A | 12/1995 | Krummheuer et al. | 139/291 |
| 5,503,197 A | 4/1996 | Bower et al. | 139/435.1 |
| 5,508,073 A | 4/1996 | Krummheuer et al. | 428/351 |
| 5,533,755 A | 7/1996 | Nelsen et al. | 280/743.1 |
| 5,651,395 A | 7/1997 | Graham et al. | 139/390 |

(Continued)

FOREIGN PATENT DOCUMENTS

EP    0 953 481    11/1999

(Continued)

*Primary Examiner*—Arti Singh-Pandey
(74) *Attorney, Agent, or Firm*—Cheryl J. Brickey

(57) ABSTRACT

This invention relates generally to abrasion resistant and/or puncture resistant fabrics, coated, layered and/or laminated inflatable fabrics, and methods. More particularly, it concerns airbag cushions to which films, fabrics, layers, and/or coatings have been applied and which exhibit enhanced abrasion resistance and/or puncture resistance. The inventive inflatable fabrics are especially suited for use in automotive restraint cushions that require abrasion resistance and/or puncture resistance (such as side curtain airbags).

10 Claims, 11 Drawing Sheets

U.S. PATENT DOCUMENTS

| | | | |
|---|---|---|---|
| 5,704,402 A | 1/1998 | Bowen et al. | 139/389 |
| 5,788,270 A | 8/1998 | Haland et al. | 280/729 |
| 5,945,186 A | 8/1999 | Li et al. | 428/36.1 |
| 5,952,250 A | 9/1999 | Moon et al. | 442/203 |
| 6,220,309 B1 * | 4/2001 | Sollars, Jr. | 139/389 |
| 6,239,046 B1 * | 5/2001 | Veiga et al. | 442/76 |
| 6,770,578 B2 * | 8/2004 | Veiga | 442/164 |
| 2001/0005660 A1 | 6/2001 | Li et al. | |
| 2001/0009829 A1 | 7/2001 | Sollars, Jr. et al. | |
| 2001/0012743 A1 | 8/2001 | Vogt et al. | |
| 2001/0020779 A1 | 9/2001 | Bosgieter et al. | |
| 2001/0030418 A1 | 10/2001 | Keshavaraj | |
| 2001/0031325 A1 | 10/2001 | Keshavaraj | |
| 2001/0054813 A1 | 12/2001 | Keshavaraj | |
| 2002/0008374 A1 | 1/2002 | Keshavaraj | |
| 2002/0020998 A1 | 2/2002 | Keshavaraj | |
| 2002/0027352 A1 | 3/2002 | Keshavaraj | |
| 2002/0027353 A1 | 3/2002 | Keshavaraj | |
| 2002/0034597 A1 | 3/2002 | Keshavaraj | |
| 2002/0041086 A1 | 4/2002 | Keshavaraj | |
| 2002/0043792 A1 | 4/2002 | Keshavaraj | |

FOREIGN PATENT DOCUMENTS

| | | |
|---|---|---|
| GB | 2 323 340 | 9/1998 |
| WO | 97 37874 | 10/1997 |
| WO | 98 47744 | 10/1998 |

* cited by examiner

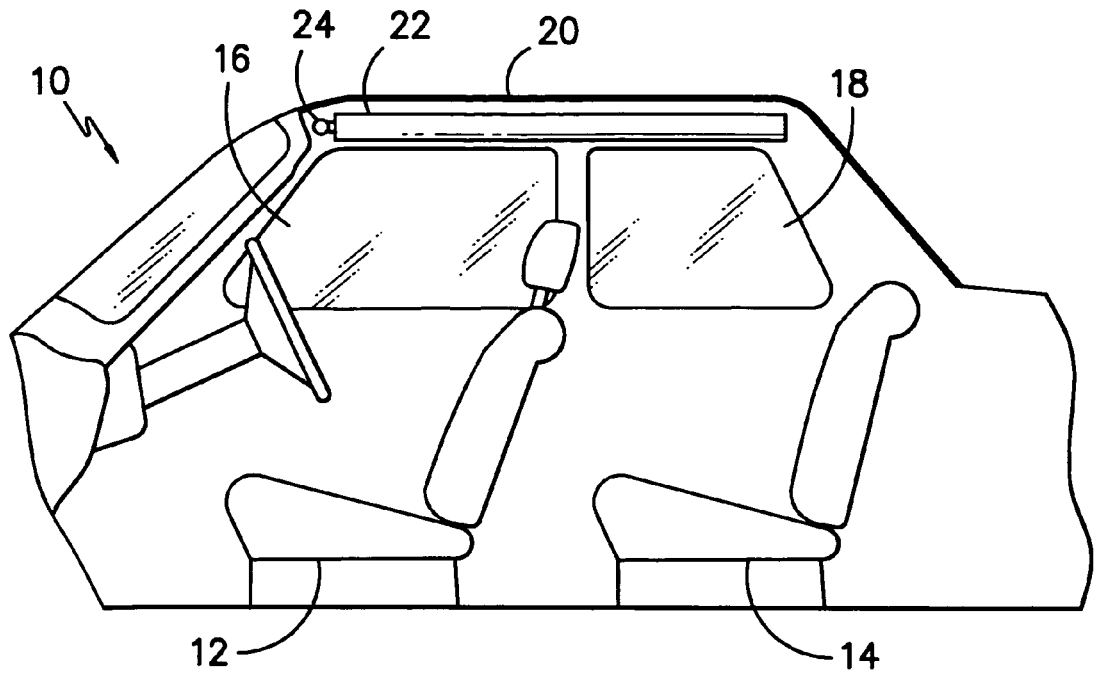
FIG. -1-
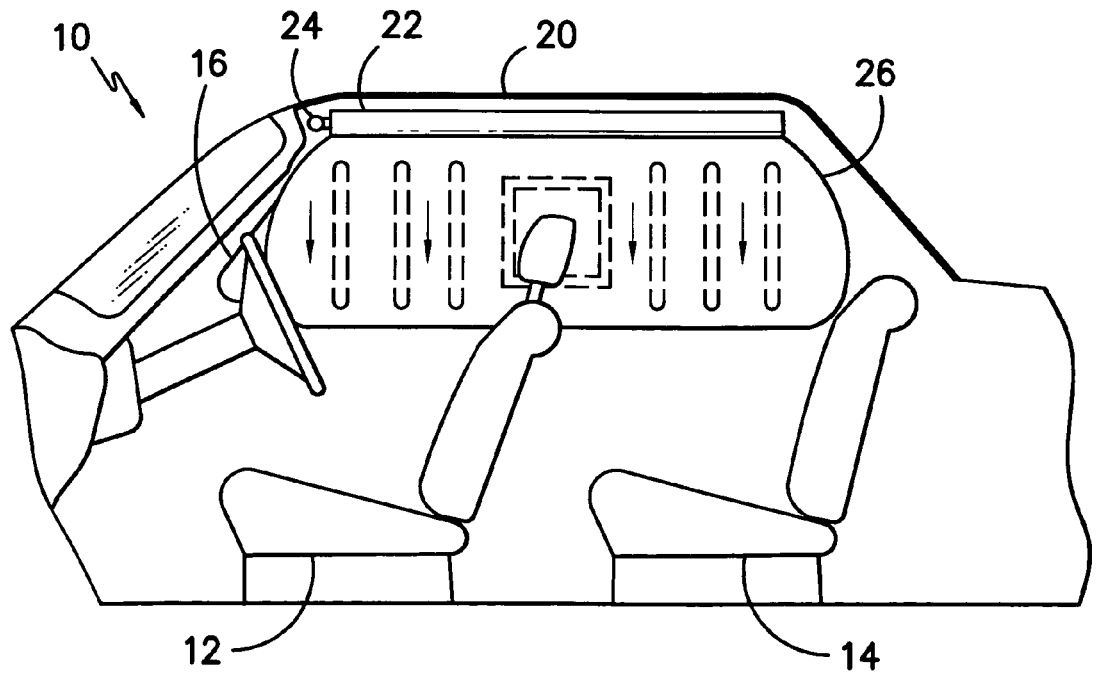
FIG. -2-

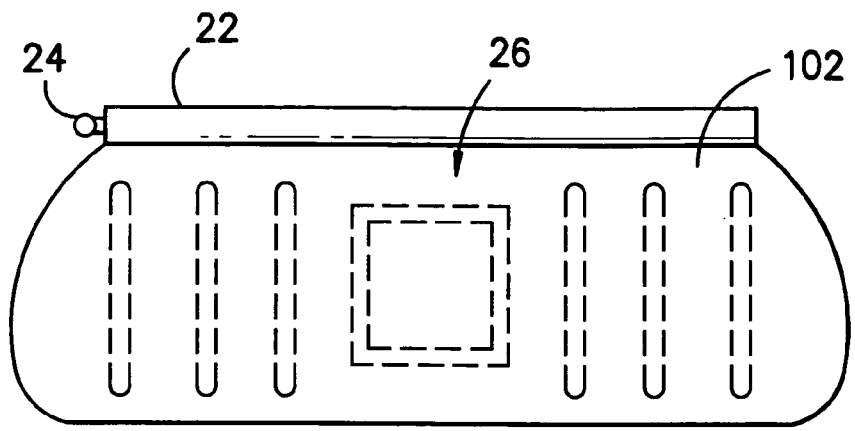
FIG. -3-
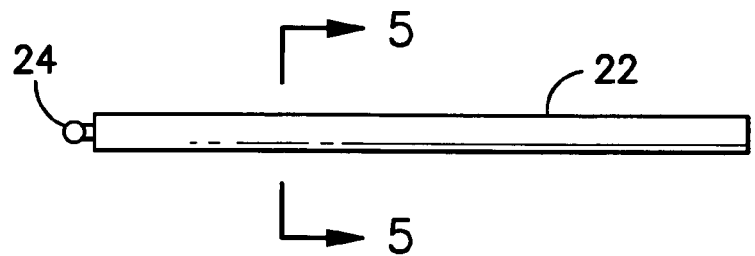
FIG. -4-
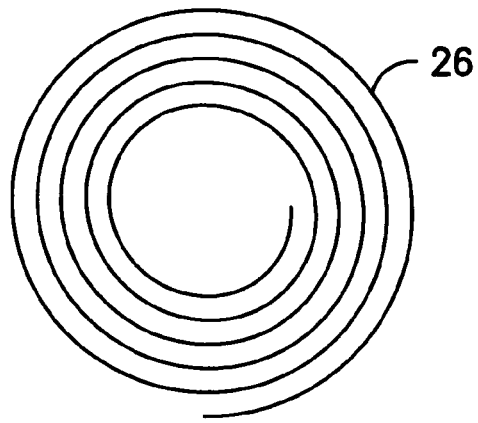
FIG. -5A-

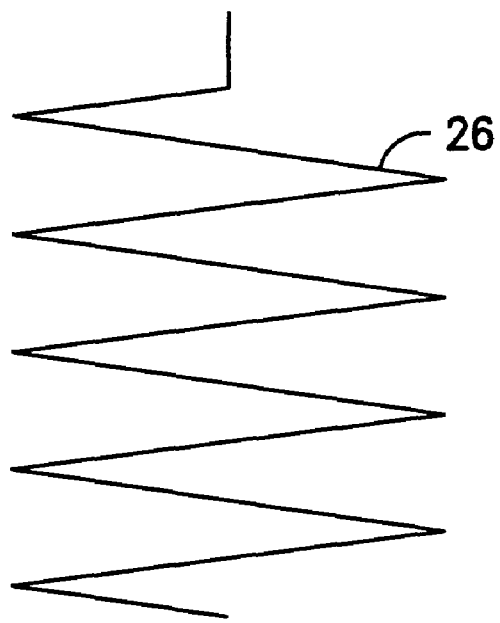
FIG. -5B-
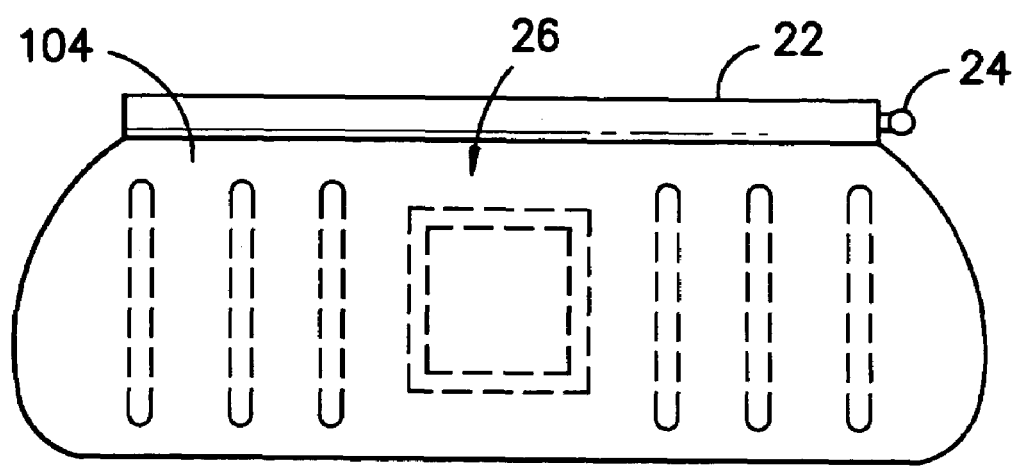
FIG. -6-

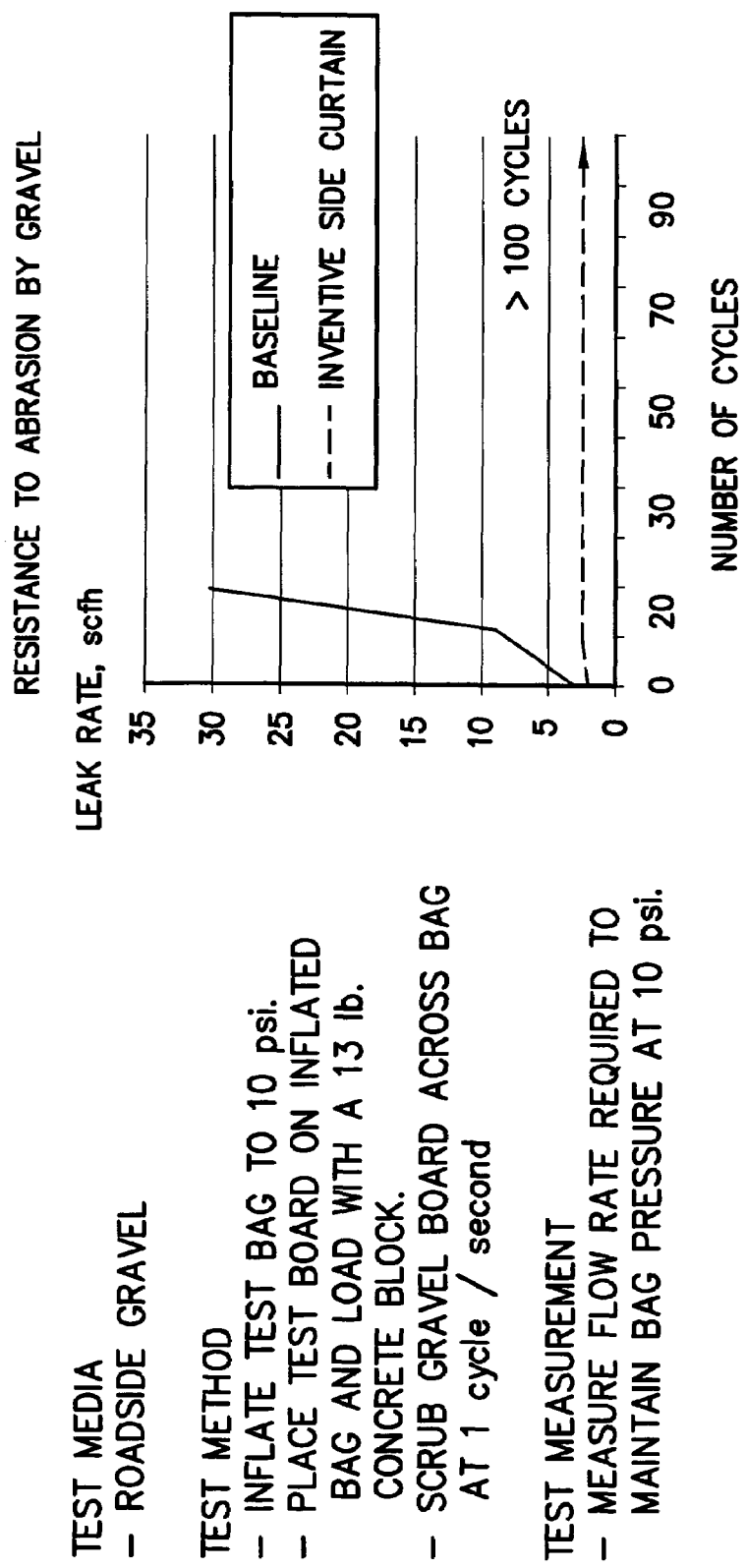
FIG. -7-

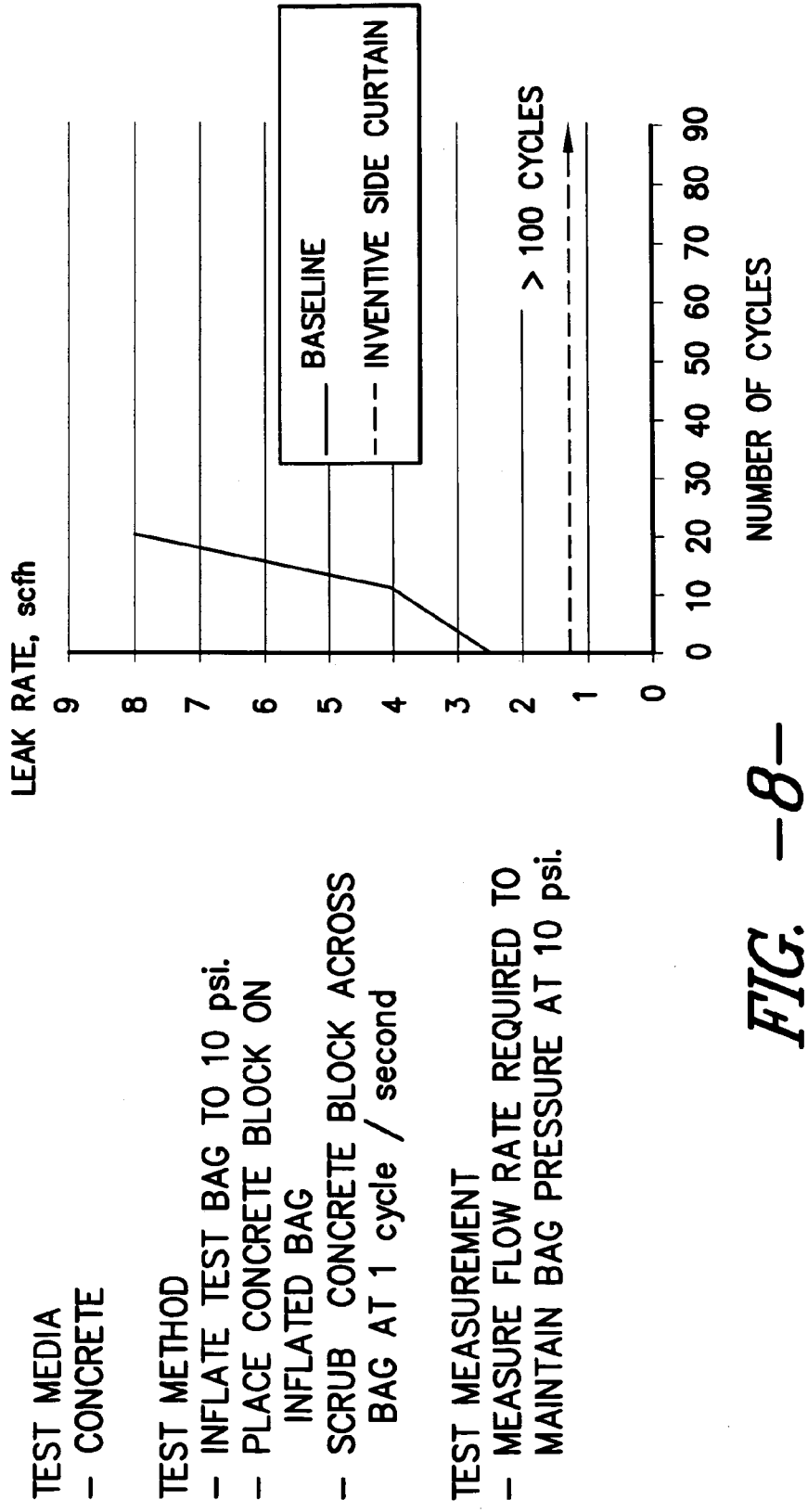
FIG. -8-

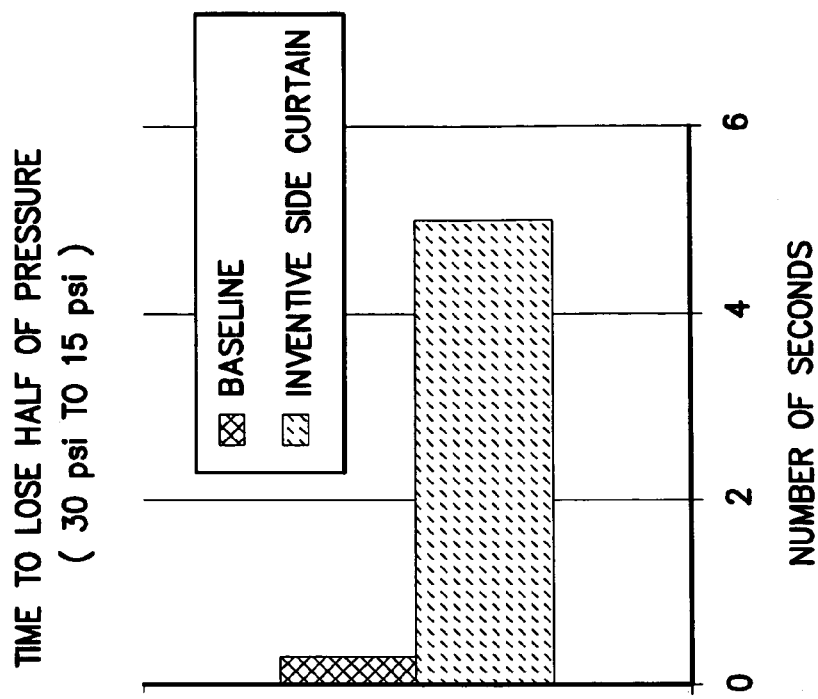
FIG. -9-

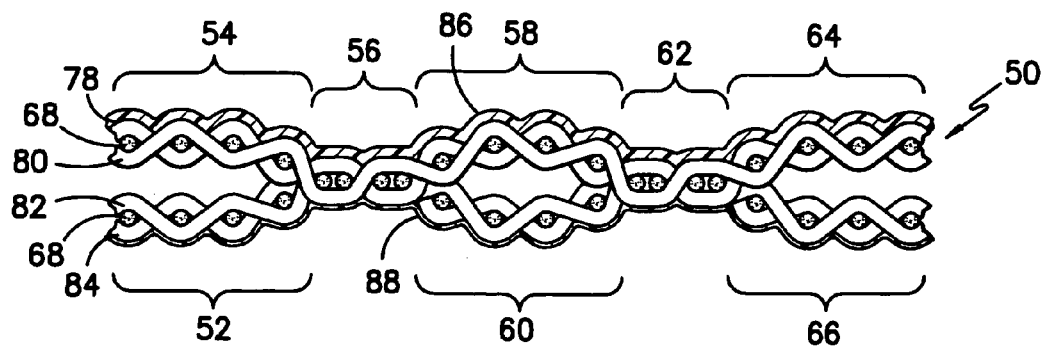
FIG. -10-
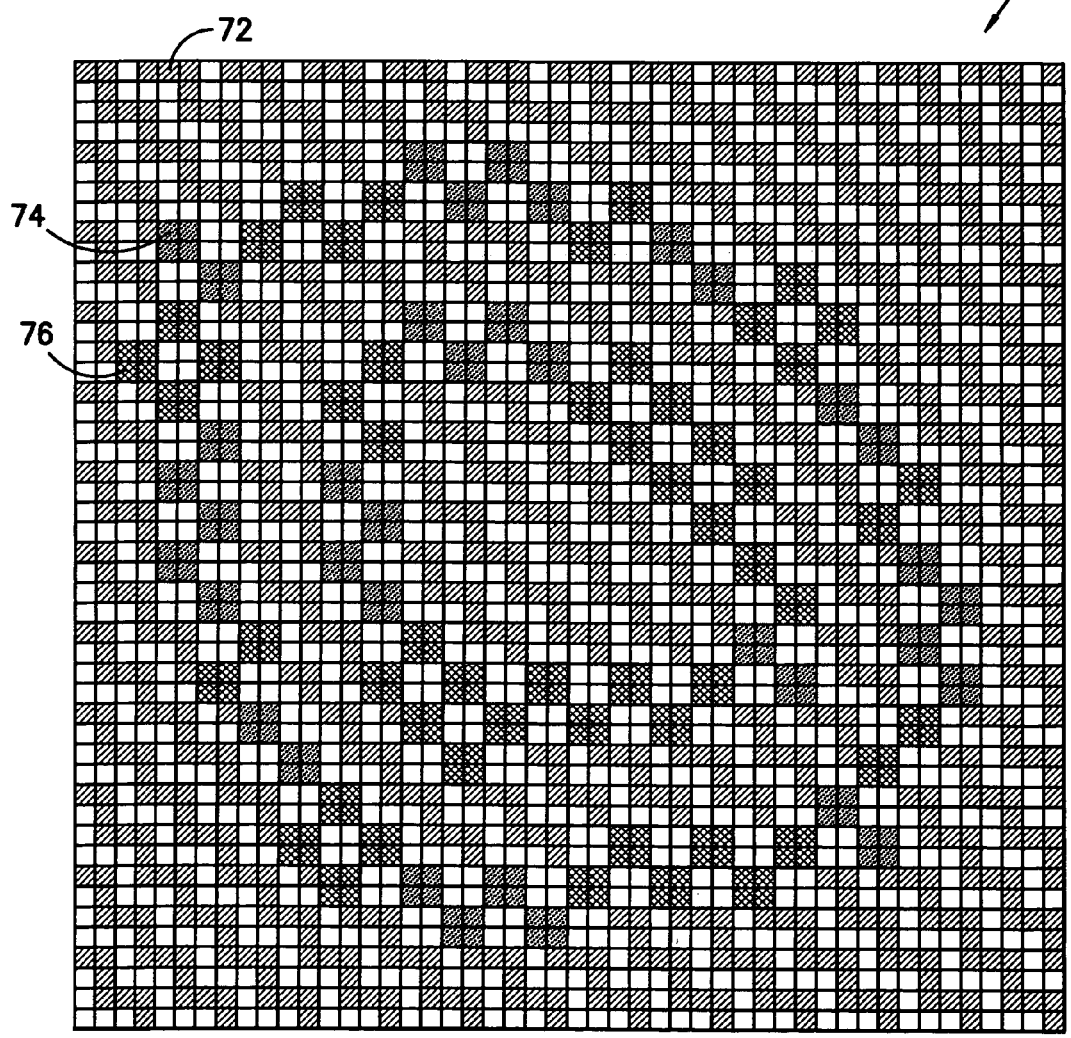
FIG. -11-

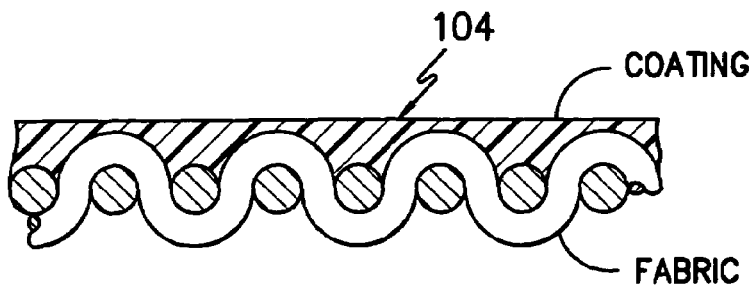
FIG. -12A-
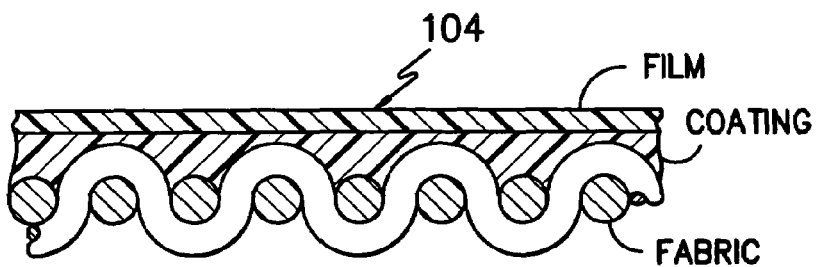
FIG. -12B-
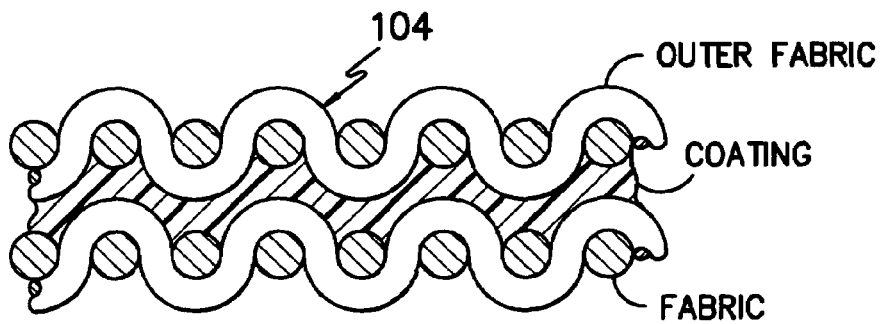
FIG. -12C-
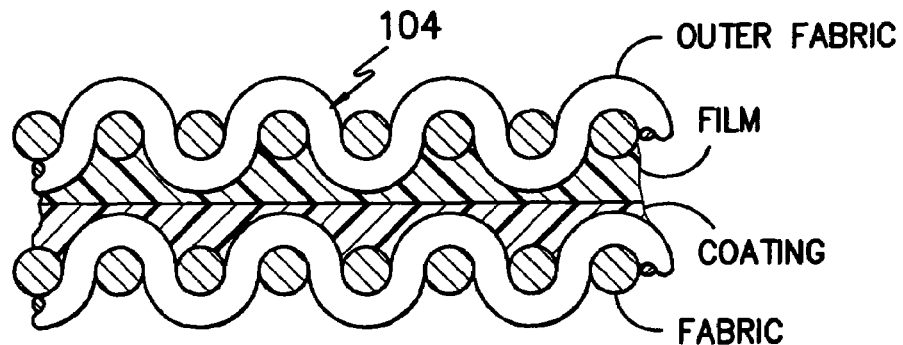
FIG. -12D-

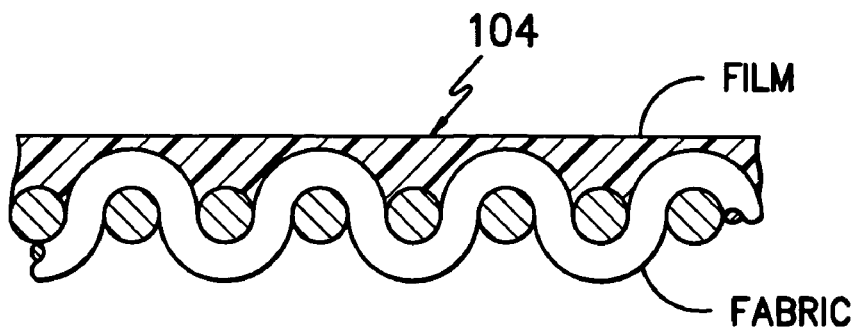
FIG. −12E−
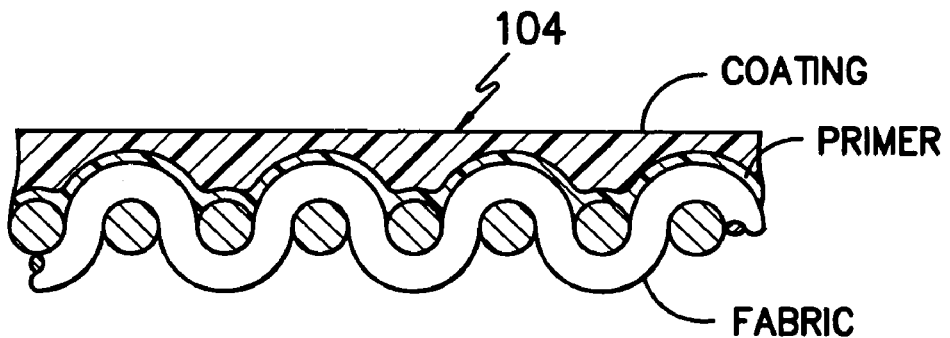
FIG. −12F−
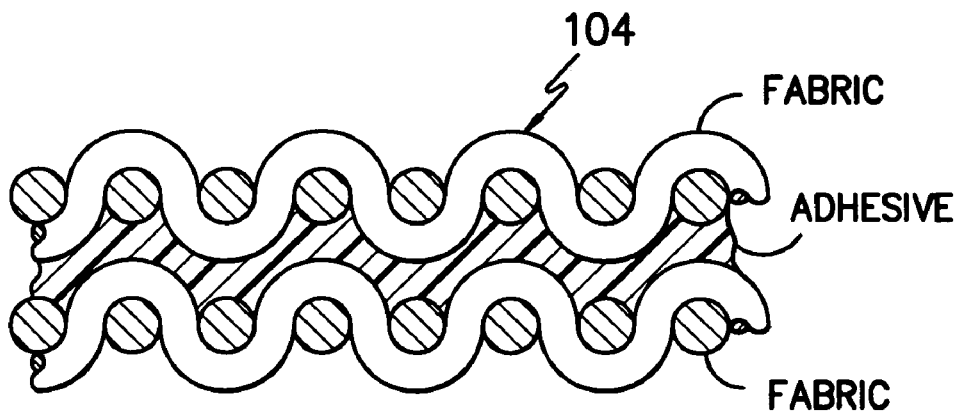
FIG. −12G−

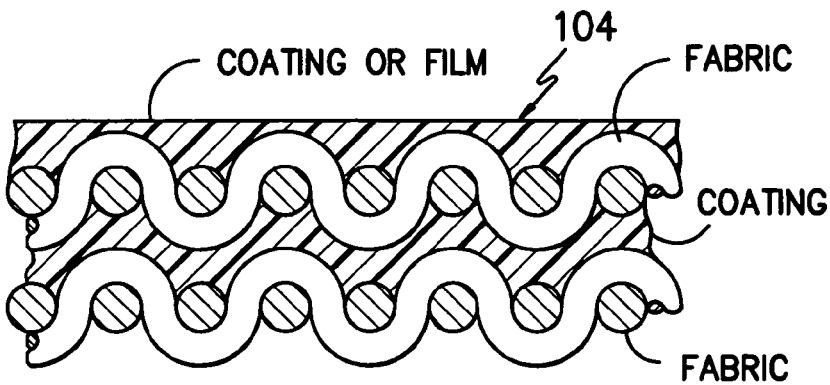
FIG. −12H−
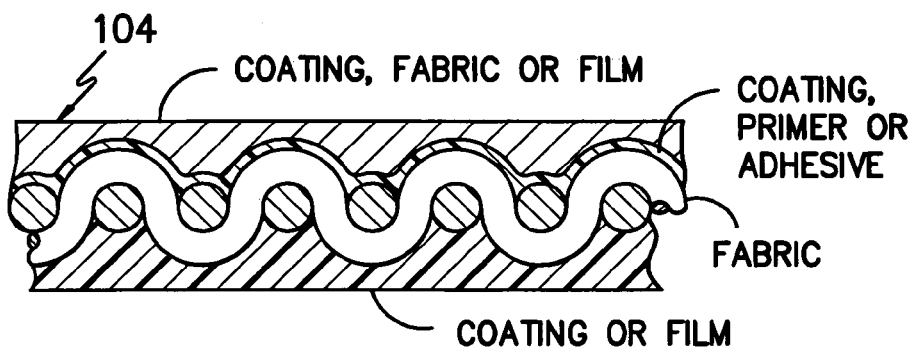
FIG. −12I−
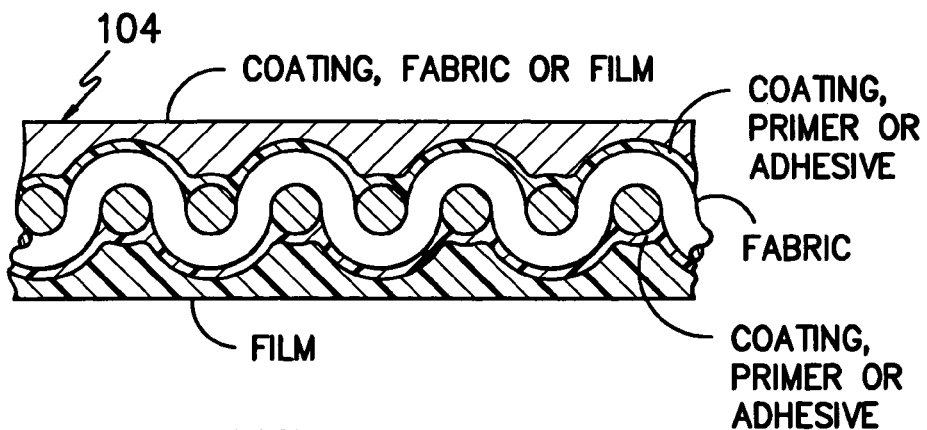
FIG. −12J−

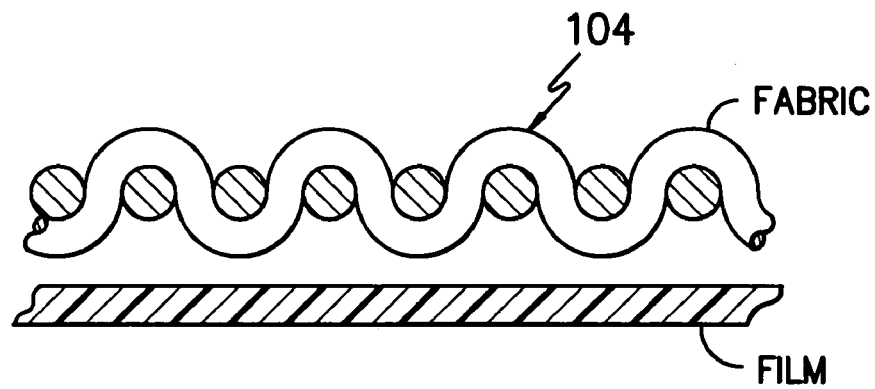
FIG. —12K—
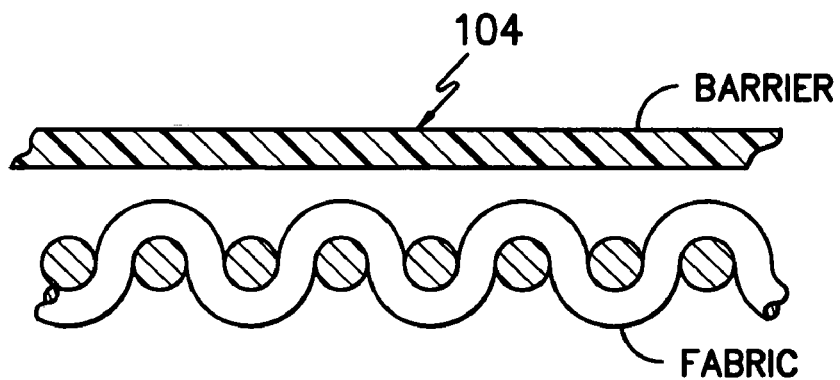
FIG. —12L—
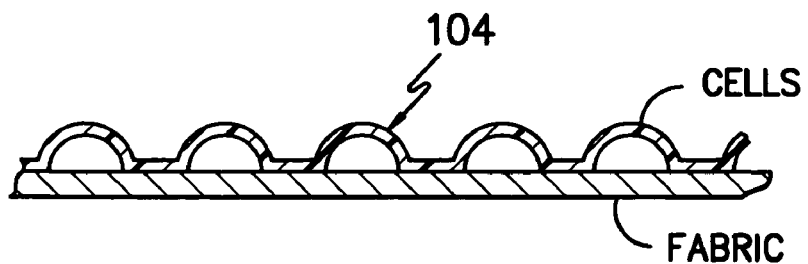
FIG. —12M—

FABRICS, AIRBAGS AND METHODS

CROSS-REFERENCE TO RELATED APPLICATIONS

This application claims the benefit of and is a continuation of application Ser. No. 09/942,133 filed Aug. 29, 2001 now abandoned, which claims the benefit of application U.S. provisional 60/229,112 filed Aug. 30, 2000, each of which is hereby incorporated by reference.

FIELD OF THE INVENTION

This invention relates generally to abrasion resistant and/or puncture resistant fabrics, coated, layered and/or laminated inflatable fabrics, and methods. More particularly, it concerns airbag cushions to which films, fabrics, layers, and/or coatings have been applied and which exhibit enhanced abrasion resistance and/or puncture resistance. The inventive inflatable fabrics are especially suited for use in automotive restraint cushions that require abrasion resistance and/or puncture resistance (such as side curtain airbags).

BACKGROUND OF THE INVENTION

Side curtain airbags differ from driver side and passenger side airbags in that side curtain airbags preferably retain at least half of their inflated pressure for a period of 5 seconds or longer. Side curtain airbags must retain their fill for a longer period since a rollover event would occur over some duration rather than, for example, an instantaneous front or rear impact.

Further, side curtain airbags which provide for rollover protection not only must keep their fill for a certain duration, but also should provide some abrasion and/or puncture resistance so that they do not lose their inflation as the vehicle rolls and the exterior of the bag contacts a broken window, asphalt, concrete, debris, and/or the like.

Although it has been known to provide low permeability driver and passenger side airbag fabrics and airbag cushions, attempts at constructing side curtain airbags and in particular side curtain airbags with rollover protection has been problematic.

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yarn by weaving practices that are well known in the art.

The coated material has found acceptance because it acts as an impermeable barrier to the inflation medium. This inflation medium is generally a nitrogen, argon, or similar gas or gas blend generated from a gas generator or inflator. Such gas is conveyed into the cushion at a relatively warm temperature. The coating obstructs the permeation of the fabric by such hot gas, thereby permitting the cushion to rapidly inflate without undue decompression during a collision event.

Airbags may also be formed from uncoated fabric which has been woven in a manner that creates a product possessing low permeability or from fabric that has undergone treatment such as calendering to reduce permeability. Fabrics which reduce air permeability by calendering or other mechanical treatments after weaving are disclosed in U.S. Pat. No. 4,921,735; U.S. Pat. No. 4,977,016; and U.S. Pat. No. 5,073,418 (all incorporated herein by reference).

Silicone coatings typically utilize either solvent based or complex two component reaction systems. Dry coating weights for silicone have been in the range of about 3 to 4 ounces per square yard or greater for both the front and back panels of side curtain airbags. As will be appreciated by one of ordinary skill in this art, high add on weights substantially increase the cost of the base fabric for the airbag and make packing within small airbag modules very difficult. Furthermore, silicone exhibits very low tensile strength and elongation at break characteristics which do not withstand high pressure inflation easily without the utilization of very thick coatings.

The use of certain polyurethanes as coatings as disclosed in U.S. Pat. No. 5,110,666 to Menzel et al. (herein incorporated by reference) permits low add on weights reported to be in the range of 0.1 to 1 ounces per square yard but the material itself is relatively expensive and is believed to require relatively complex compounding and application procedures due to the nature of the coating materials. The U.S. Pat. No. 5,110,666, however, fails to disclose any pertinent elasticity and/or tensile strength characteristics of their particular polyurethane coating materials. Furthermore, there is no discussion pertaining to the importance of the coating ability (and thus correlated low air permeability) at low add-on weights of such polyurethane materials on side curtain airbags (only for fabrics which are utilized within driver or passenger side cushions).

All airbags must be inflatable extremely quickly; upon sensing a collision, in fact, airbags usually reach peak pressures within 10 to 20 milliseconds. Regular driver side and passenger side air bags are designed to withstand this enormous inflation pressure; however, they also deflate very quickly in order to effectively absorb the energy from the vehicle occupant hitting the bag. Such driver and passenger side cushions (airbags) are thus made from low permeability fabric, but they also deflate quickly at connecting seams (which are not coated to prevent air leakage) or through vent holes. Furthermore, the low add-on coatings taught within Menzel, and within U.S. Pat. No. 5,945,186 to Li et al., would not provide long-term gas retention; they would actually not withstand the prolonged and continuous pressures supplied by activated inflators for more than about 2 seconds, at the most. The low permeability of these airbag fabrics thus aid in providing a small degree of sustained gas retention within driver and passenger airbag cushions to provide the deflating cushioning effects necessary for sufficient collision protection. Such airbag fabrics would not function well with side curtain airbags, since, at the very least, the connecting seams which create the pillowed, cushioned structures within such airbags, as discussed in greater detail below, would not be coated. As these areas provide the greatest degree of leakage during and after inflation, the aforementioned patented low coating low permeability airbag fabrics would not be properly utilized within side curtain airbags.

As alluded to above, there are three primary types of different airbags, each for different end uses. For example, driver-side airbags are generally mounted within steering columns and exhibit relatively high air permeabilities in order to act more as a cushion for the driver upon impact. Passenger-side airbags also comprise relatively high air permeability fabrics which permit release of gas either therethrough or through vents integrated therein. Both of these types of airbags are designed to protect persons in sudden collisions and generally burst out of packing modules from either a steering column or dashboard (and thus have multiple "sides").

Side curtain airbags, however, have been designed primarily to protect passengers during rollover crashes by retaining their inflation state for a long duration and generally unroll from packing containers stored within the roofline along the side windows of an automobile (and thus have a back and front side only). Side curtain airbags therefore not only provide cushioning effects but also should provide protection from broken glass and other debris. As such, it is imperative that side curtain airbags, as noted above, retain large amounts of gas, as well as high gas pressures, to remain inflated throughout the longer time periods of the entire potential rollover situation.

To accomplish this, these side curtains are generally coated with very large amounts of sealing materials on both the front and back sides. Since most side curtain airbag fabrics comprise woven blanks that are either sewn, sealed, or integrally woven together, discrete areas of potentially high leakage of gas are prevalent, particularly at and around the seams. It has been accepted as a requirement that heavy coatings were necessary to provide the low permeability (and thus high leak-down time) necessary for side curtain airbags. Without such heavy coatings, such airbags would most likely deflate too quickly and thus would not function properly during a rollover collision. As will be well understood by one of ordinary skill in this art, such heavy coatings add great cost to the overall manufacture of the target side curtain airbags. There is thus a great need to manufacture low permeability side curtain airbags with less expensive (preferably lower coating add-on weight) coatings without losing the aging, humidity, and permeability characteristics necessary for proper functioning upon deployment.

Furthermore, there is a current drive to store such low permeability side curtain airbags within cylindrically shaped modules. Since these airbags are generally stored within the rooflines of automobiles, and the area available is quite limited, there is always a great need to restrict the packing volume of such restraint cushions to their absolute minimum. However, the previously practiced low permeability side curtain airbags have proven to be very cumbersome to store in such cylindrically shaped containers at the target automobile's roofline. The actual time and energy required to roll such heavily coated low permeability articles as well as the packing volume itself, has been very difficult to reduce. Furthermore, with such heavy coatings utilized, the problems of blocking (i.e., adhering together of the different coated portions of the cushion) are amplified when such articles are so closely packed together. The chances of delayed unrolling during inflation are raised when the potential for blocking is present. Thus, a very closely packed, low packing volume, low blocking, low permeability side curtain airbag is highly desirable.

SUMMARY OF THE INVENTION

In light of the background above, it is an object of the present invention to provide an abrasion resistant and/or puncture resistant fabric, airbag cushion, and/or method.

In accordance with a more particular object of the present invention, there is provided an improved side curtain airbag which affords rollover protection.

It is still another object to provide an airbag fabric or cushion which has both abrasion and puncture resistance.

It is yet still another object of the present invention to provide an airbag which has an inner or inside surface, wall, construction, or coating adjacent the occupant which is at least one of lighter, softer, more flexible, less abrasive, and the like than an outer or outside surface, wall, construction, or coating adjacent the window of a vehicle.

It is still another object of the present invention to provide an airbag having differing inner and outer surfaces, constructions, walls, coatings, or the like, with the outer surface, wall, construction, coating, or the like having better puncture resistance and/or abrasion resistance than the inner surface, wall, construction, coating, or the like.

Also, it can be readily seen that there exists a need for a low permeability, side curtain airbag that provides a necessarily high leak-down time upon inflation and after long-term storage.

It is therefore an object of this invention to provide a coated and/or laminated airbag possessing extremely high leak-down time characteristics after inflation and thus complementary low permeability characteristics. Another object of the invention is to provide an inexpensive side curtain airbag cushion. A further object of this invention is to provide a highly effective airbag coating or adhesive formulation or laminate construction providing extremely low permeability airbag structures after inflation. An additional object of this invention is to provide an airbag which not only provides beneficial and long-term low permeability, but also exhibits excellent long-term storage stability (through heat aging and humidity aging testing). Yet another object of the invention is to provide a low permeability side curtain airbag possessing a low rolled packing volume and non-blocking characteristics for effective long-term storage within the roofline of an automobile.

Accordingly, one embodiment this invention is directed to an airbag cushion comprising a coated fabric, wherein said fabric is laminated with a film, wherein said film is of about 0.5-10.0 mils thick, preferably 2-4 mils, and/or wherein said airbag cushion, after long-term storage, exhibits a characteristic leak-down time of at least 5 seconds. Also, this invention concerns an airbag cushion comprising a coated fabric, wherein said fabric is coated with a laminate film; wherein said laminate film possesses a tensile strength of at least 2,000 psi and an elongation of at least 180%; and wherein said airbag cushion, after long-term storage, exhibits a characteristic leak-down time of at least 5 seconds.

A mil is a unit of thickness equal to one thousandth of an inch (0.0254 millimeter). A mil of coating is approximately equal to about one ounce per square yard of coating.

The term "characteristic leak-down time" is intended to encompass the measurement of time required for the entire amount of inflation gas introduced within an already-inflated (to a peak initial pressure which "opens" up the areas of weak sealing) and deflated airbag cushion to leak out upon subsequent re-inflation at a constant pressure of 10 psi. It is well known and well understood within the airbag art, and particularly concerning side curtain (low permeability) airbag cushions, that retention of inflation gas for long periods of time is of utmost importance during a collision. Side curtain airbags are designed to inflate as quickly as driver- and passenger-side bags, but they must deflate very slowly to protect the occupants during roll over and side impact. Thus, it is imperative that the bag exhibit a very low leakage rate after the bag experiences peak pressure during the instantaneous, quick inflation. Hence, the coating on the bag must be strong enough to withstand the shock and stresses when the bag is inflated so quickly. Thus, a high characteristic leak-down time measurement is paramount in order to retain the maximum amount of beneficial cushioning gas within the inflated airbag. Airbag leakage after inflation (and after peak pressure is reached) is therefore closely related to actual pressure retention characteristics. The pressure retention characteristics (hereinafter referred to as "leak-down time") of already-inflated and deflated side curtain airbags can be described by a characteristic leak-down time t, wherein:

$$t(\text{second}) = \frac{\text{Bag Volume (ft}^3)}{\text{Volumetric leakage rate } (SCFH^*) \text{ at } 10 \text{ psi}} \times 3600$$

*SCFH: standard cubic feet per hour.

It is understood that the 10 psi constant is not a limitation to the invention; but merely the constant pressure at which the characteristic leak-down time measurements are made. Thus, even if the pressure is above or below this amount during actual inflation or after initial pressurizing of the airbag, the only limitation is that if one of ordinary skill in the art were to measure the bag volume and divide that by the volumetric leakage rate time (measured by the amount leaking out of the target airbag during steady state inflation at 10 psi), the resultant measurement in time would be at least 5 seconds. Preferably, this time is greater than about 9 seconds; more preferably, greater than about 15 seconds; and most preferably, greater than about 20 seconds.

Alternatively, and in a manner of measurement with uninflated side curtain airbags, the term "leak-down time" may be measured as the amount of time required for at least half of the introduced inflation gas to escape from the target airbag after initial peak pressure is reached. Thus, this measurement begins the instant after peak initial pressure is reached upon inflation (such as, traditionally, about 30 psi) with a standard inflation module which continues to pump gas into the target airbag during and after peak initial pressure is reached. It is well understood that the pressure of gas forced into the airbag after peak initial pressure is reached will not remain stable (it decreases during the subsequent introduction of inflation gas), and that the target airbag will inevitably permit escape of a certain amount of inflation gas during that time. The primary focus of such side curtain airbags (as noted above) is to remain inflated for as long as possible in order to provide sufficient cushioning protection to vehicle occupants during rollover accidents. The greater amount of gas retained, the better cushioning effects are provided the passengers. Thus, the longer the airbag retains a large amount of inflation gas, and consequently the greater the characteristic leak-down time, the better cushioning results are achieved. At the very least, the inventive airbag should retain at least half of its inflated gas volume 5 seconds subsequent to reaching peak initial pressure. Preferably, this time is 9 seconds, more preferably 15 seconds, and most preferably 20 seconds or more.

Likewise, the term, "after long-term storage" encompasses either the actual storage of an inventive airbag cushion within an inflator assembly (module) within an automobile, and/or in a storage facility awaiting installation. Such a measurement is generally accepted, and is well understood and appreciated by the ordinarily skilled artisan, to be made through comparable analysis after representative heat and humidity aging tests. These tests generally involve 107° C. oven aging for 16 days, followed by 83° C. and 95% relative humidity aging for 16 days and are universally accepted as proper estimations of the conditions of long-term storage for airbag cushions. Thus, this term encompasses such measurement tests. The inventive airbag fabrics should exhibit proper characteristic leak-down times after undergoing such rigorous pseudo-storage testing.

Typical road surfaces are concrete, and gravel filled asphalt. They are very abrasive to fabrics that slide on those surfaces. For the new side impact curtain-type airbag (side curtain airbag), in a rollover situation, the airbag needs to protect the occupant from directly contacting the road hazard and should not deflate quickly or break when sliding on such road surfaces.

We have found that fabric usually provides excellent abrasion resistance in most cases, and that fabrics laminated to or coated with a tough rubber material provide abrasion resistance. In the case of abrasion over typical road surfaces, we have surprisingly found that a layer of elastomer can provide much better abrasion resistance than a layer of heavy industrial fabric.

We have tested Jacquard woven airbags coated and laminated with different materials. The airbag is first inflated to and maintained at 10 psi air pressure, then a 13 lb., 1.5 ft. long concrete block was laid on one area of the bag and allowed to slide back and forth. A Jacquard bag coated with 1.2 oz/yd$^2$ polyurethane showed significant increase in air leakage rate after 5 cycles of concrete sliding abrasion. To see if an extra layer of heavy fabric would protect the airbag from such abrasion, a 420 denier, 49×49 plain weave airbag fabric was laminated on a coated Jacquard woven bag. The 420 denier fabric had many broken filaments in a few cycles. In about 25 cycles, the yarns perpendicular to the concrete sliding direction were all broken and removed by the sliding abrasion. After 25 cycles, the remaining laminated 420 denier fabric provided very little protection for the Jacquard woven bag against the sliding abrasion. A 3 mil thick Duraflex PT 9400 polyurethane film was laminated to a coated Jacquard woven airbag. After 110 cycles of sliding abrasion using the same concrete, no visual damage or change in bag leakage was observed. This finding indicates surprisingly better abrasion resistance of a thin elastomer film than a heavy industrial fabric.

We have studied airbags laminated with different films and films with different thicknesses. We have noted that the toughness of the elastomer needs to be above a certain value in order to provide the necessary abrasion resistance.

One layer of fabric may be used on top of this elastomeric layer for puncture resistance. Preferred elastomeric materials are polyurethane, Neoprene and other rubbers with high toughness. The combination of an elastomeric layer and a layer of extra fabric can provide both abrasion and puncture resistance. The elastomer layer can act as an abrasion resistant layer, gas barrier and adhesive layer between the base airbag fabric and the extra fabric top layer.

At least one embodiment of the present invention provides airbags with excellent abrasion resistance against typical road surfaces by having a tough elastomeric layer with a thickness greater than about 0.5 mil, preferably about 1.5 mil or more. Compared to a similar structure laminated with a layer of heavy fabric, the inventive structure has better abrasion resistance, better flexibility, is thinner, and costs less.

This layer of elastomer can be applied by film lamination, transfer coating, extrusion coating, and other coating methods. This layer of elastomer does not have to have uniform thickness. Instead of an elastomer layer, one can print elastomer dots on the fabric with small spacing between the dots.

Traditionally, driver and passenger airbags are energy absorbing safety barriers between an occupant and the interior of a vehicle, such as dashboard, windshield and steering wheel. New side impact curtain airbags (side curtain airbags) are now providing a safety barrier between an occupant and exterior hazards in an auto-accident. Due to the possible presence of various sharp objects such as broken window glass, nails, and jagged sheet metal in a collision, side curtain airbags with puncture resistance are needed but not currently provided to the market. The current driver side airbag or passenger airbag construction does not provide good puncture resistance at its working inflated state to hazards such as broken window glass.

The present invention encompasses the following constructions that provide superior resistance to puncture:

1. Triple layer sandwich—On at least the side facing the exterior of a vehicle, the airbag has a fabric/elastomer/fabric three layer structure (FIG. 12C). The outer fabric layer provides some abrasion resistance and combines with the strength of the inner fabric layer to provide puncture resistance. The middle elastomeric layer provides abrasion resistance and the low gas permeability to allow the airbag to stay inflated for a desired length of time at a desired pressure. The elastomeric layer can also function as an adhesive layer to bond the outer and inner fabric layers together. The choice of fabric constructions is crucial in obtaining the desired puncture resistance. To obtain the desired puncture resistance, it is preferred that the fabric be constructed from high strength yarn such as high tenacity Nylon, polyester, polyethylene (such Spectra™), and aramids (such as Kevlar™). The fabric should have high yarn density to prevent sharp objects from going through the yarn interstices. It is also desirable for the sandwich to be thin so that the whole airbag can be packed into a small volume. Therefore, fabrics from small denier yarn at high pick and end counts are preferred.
2. Airbag with an elastomeric inner bladder that is loosely attached to the outer fabric layer. The inner bladder has the ability to stretch substantially without breaking or bursting when a sharp object penetrates through the outer layer of airbag fabric. Thus, the inner bladder functions much like a puncture resistant inner tube for a vehicle tire (FIG. 12K).
3. A puncture resistant barrier interposed between the airbag and exterior of the vehicle when the airbag is deployed. The barrier may or may not be attached firmly to the airbag itself (FIG. 12L).
4. A system of small gas filled cells interposed between the airbag and exterior of vehicle when the airbag is deployed. The system of cells is designed to support the airbag and keep sharp objects from penetrating the airbag even when some of the cells themselves are punctured (FIG. 12M).

To prevent puncture and premature deflation of an airbag during a collision, various combinations of fabric, coating and films are used in accordance with selected embodiments of the present invention to achieve the desired result.

It is common practice to coat a fabric or woven structure with the same coating and the same weight coating on both sides. The nature of at least one embodiment of the present invention is to provide a product that has a coating on both sides of the fabric or woven structure that can provide different characteristics or performance for each side (side 102, 104 of airbag 126 of FIGS. 3 and 6). The method of accomplishing this can be through utilizing a different weight coating on one side versus another or using a different chemical on each side. The coating can be tailored to the performance that is required e.g. the outside (104) OPW can be coated with a tough polymer to resist puncture or abrasion while the side toward the occupant (102) can be coated with a non abrasive coating. The primary use of this would be for jacquard woven inflatable restraints, but could be used for any inflatable fabric, cushion, airbag, etc.

Selected objects of at least one embodiment of the present invention include:

On a jacquard woven fabric provide a different weight coating on each side based on end use performance requirements.

On a jacquard woven fabric provide a different coating on either side based on end use performance requirements.

On a flat fabric provide a different weight coating on either side.

Allows the design of coated fabrics tailored to specific end use performance requirements.

A sewn bag made of coated fabric with different coatings on each side.

Curtain airbags used for rollover protection are typically designed as one gas holding system. In rollover accidents, these airbags have a high probability of coming in contact with road and broken glass debris. Any puncture or abrasion to the fabric structure of the bag away from the occupant side because of the debris from the broken glass or from the road can make this entire system ineffective. Also, the portion of the curtain bag closer to the occupant should be less abrasive to the occupant during deployment or the pressurization phase.

In order to accomplish this, quite different properties are given to either side of the side curtain. For example, different size yarns can be used on each side of the curtain, yarns of bigger diameter and higher tenacity can be used on the side away from the occupant, and the like. Bigger yarns provide higher surface area and hence provide better resistance to puncture. On the side of the side curtain where the occupant comes in contact, finer yarns can be used in order to be gentler on the occupant.

Curtain bags produced with many different technologies like sewn, jacquard or dobby woven, welded or sealed seams can use this approach.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

FIG. 1 depicts the side, inside view of a vehicle prior to deployment of the inventive side curtain airbag.

FIG. 2 depicts the side, inside view of the vehicle after deployment of the inventive side curtain airbag.

FIG. 3 depicts an inside side view of the side curtain airbag.

FIG. 4 provides a side view of a side curtain airbag container.

FIG. 5A provides a schematic cross-sectional view of a stored airbag within the container of FIG. 4.

FIG. 5B provides a schematic cross-sectional view of an alternatively stored airbag.

FIG. 6 depicts an outside side view of the airbag of FIG. 3.

FIG. 7 is a graphical representation of resistance to abrasion by gravel.

FIG. 8 is a graphical illustration of resistance to abrasion by concrete.

FIG. 9 is a graphical representation of resistance to puncture by glass (time to lose half of initial pressure).

FIG. 10 is a cross-sectional view of an inventive all-woven inflatable fabric showing double and single layer areas including two separate single layer areas.

FIG. 11 is a weave diagram illustrating a potentially preferred repeating pick pattern formed using repeating plain weave and basket weave four-pick arrangements.

FIGS. 12A-12M are schematic cross-sectional layer diagrams of selected embodiments of the side wall of the airbag toward the window.

DETAILED DESCRIPTION OF THE INVENTION

In accordance with at least one embodiment, the inventive coating and/or film preferably possess a tensile strength of at least 2,000 psi and an elongation to break of greater than about 180%. Preferably, the tensile strength is at least 3,000 psi, more preferably, 6,000 psi, and most preferably at least about 8,000 psi (the high end is basically the highest one can produce which can still adhere to a fabric surface). The preferred elongation to break is more than about 200%, more preferably more than about 300%, and most preferably more than about 600%. These characteristics of the film and/or coating translate to a material that is both very strong (and thus will withstand enormous pressures both at inflation and during the time after inflation and will not easily break) and can stretch to compensate for such large inflation, etc., pressures. The film itself is produced prior to actual contact with the target airbag cushion, or fabric, surface. In order to apply such a film, a lamination procedure is performed through the simultaneous exposure of heat and pressure over the film while in contact with the target surface. The laminate may be applied over any portion of the target structure, although preferably it coats the entire exterior surface of the cushion or fabric. Also, more than one laminated film may be present on the target cushion as one type of film (possessing certain tensile strength and elongation characteristics) may be preferably applied to certain discrete areas of the target cushion while a different film with different characteristics may be selected at other locations (such as at the seams). The only requirement is that the final product exhibit the aforementioned high leak-down properties. The film and/or coating appears to act by "cementing" the contacted individual yarns in place and possibly preventing leakage through open areas between woven yarns and/or stitches. During inflation, then, the film and/or coating prevents leakage through the interstitial spaces between the yarns and aids in preventing yarn shifting (which may create larger spaces for possible gas escape).

The utilization of such high tensile strength and high elongation at break components permits the consequent utilization, surprisingly, of low add-on weight amounts of such films or coatings. Normally, the required coatings (which are not films, but actual coating formulations applied to the surface which then may form non-laminated films) on side curtain airbags are at least 3.5 ounces per square yard (with the standard actually higher than that, at about 4.0). The inventive airbag cushions require merely about 0.5 or more mils thick or about 0.5 ounces per square yard of the desired film and/or coating to effectuate the desired high characteristic leak-down time (low permeability). Furthermore, the past coatings were required to exhibit excellent heat and humidity aging stability. Unexpectedly, even at such low add-on amounts, and particularly with historically questionable coating materials (polyurethanes, for example), the inventive coatings, and consequently, the inventive coated airbag cushions, exhibit excellent heat aging and humidity aging characteristics. Thus, the coating compositions and coated airbags are clearly improvements within this specific airbag art.

Of particular interest as the desired films are polyurethanes, although any film which possesses the same desired tensile strength and elongation characteristics noted above may function within this inventive low permeability airbag cushion. Copolymers of polyurethanes, polyamides, and the like, may be utilized, as merely one type of example. Also, such films may or may not be cross-linked on the airbag surface. Preferably, the film is a polyurethane and most preferably is a polycarbonate polyurethane or a polyurethane film based on polytetramethylene glycol diol (available from Deerfield Urethane, Inc., Ivyland, Pa., under the tradename Dureflex™ PT9400). This specific film exhibits a tensile strength of 8,000 psi and an elongation at break of about 600%. Such a film may be added in an amount of as low as about 0.5 mils or ounces per square yard on the desired cushion and still provide the requisite high characteristic leak-down time. Of course, any other film meeting the characteristics as noted above is encompassed within this invention; however, the add-on weights of other available films may be greater than this preferred one, depending on the actual tensile strength and elongation properties available. However, an upper limit of about 10.0 mils or ounces per square yard should not be exceeded to meet this invention. The desired films may be added in multiple layers if desired as long the required thickness for the overall coating is not exceeded. Alternatively, the multiple layer film/coating system may also be utilized as long as at least one film possessing the desired tensile strength and elongation at break is utilized and the requisite low permeability is exhibited.

Other possible components present within or on these films are thickeners, antioxidants, flame retardants, coalescent agents, adhesion promoters, and colorants. In accordance with the potentially preferred practices of the present invention, a primer or adhesive coating is first applied to the target cushion surface. Upon drying of this first layer, the desired film is then laminated through heat and pressure to the selected areas of the target surface for a sufficient time to effectuate lamination. Preferably, the preferred film (or films) will not include any silicone, due to the extremely low tensile strength (typically below about 1,500 psi) characteristics exhibited by such materials. However, in order to provide effective aging and non-blocking benefits, such components may be applied to the film as a topcoat as long as the add-on weight of the entire film and topcoat does not exceed about 10.0 ounces per square yard. Additionally, elastomers comprising polyester or polyether segments or other similar components, are undesirable, particularly at very low add-on weights (i.e., 0.8-1.2 oz/yd$^2$) due to stability problems in heat and humidity aging (polyesters easily hydrolyze in humidity and polyethers easily oxidize in heat); however, such elastomers may be utilized in topcoat formulations as long, again, as the 10.0 ounces per square yard is not exceeded. For puncture resistance, silicone can be used but should be added in greater quantities than other elastomers.

Among the other additives particularly preferred within or on the film (or films) are heat stabilizers, flame retardants, primer adhesives, and materials for protective topcoats. A potentially preferred thickener is marketed under the trade designation NATROSOL® 250 HHXR by the Aqualon division of Hercules Corporation which is believed to have a place of business at Wilmington, Del. In order to meet Federal Motor Vehicle Safety Standard 302 flame retardant requirements for the automotive industry, a flame retardant is also preferably added to the compounded mix. One potentially preferred flame retardant is AMSPERSE F/R 51 marketed by Amspec Chemical Corporation which is believed to have a place of business at Gloucester City, N.J. As noted above, primer adhesives may be utilized to facilitate adhesion between the surface of the target fabric and the film itself.

Thus, although it is preferable for the film to be the sole component of the entire coating in contact with the fabric surface, it is possible to utilize adhesion promoters, such as isocyanates, epoxies, functional silanes, and other such resins with adhesive properties, without deleteriously effecting the ability of the film to provide the desired low permeability for the target airbag cushion. A topcoat component, as with potential silicones, as noted above, may also be utilized to effectuate proper non-blocking characteristics to the target airbag cushion. Such a topcoat may perform various functions, including, but not limited to, improving aging of the film (such as with silicone) or providing blocking resistance due to the adhesive nature of the coating materials (most noticeably with the preferred polyurethane polycarbonates).

Airbag fabrics must pass certain tests in order to be utilized within restraint systems. One such test is called a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 100° C. for 7 days. If the force required to pull the two swatches apart after this time is greater than 50 grams, or the time required to separate the fabrics utilizing a 50 gram weight suspended from the bottom fabric layer is greater than 10 seconds, the coating fails the blocking test. Clearly, the lower the required separating force, the more favorable the coating. For improved blocking resistance (and thus the reduced chance of improper adhesion between the packed fabric portions), topcoat components may be utilized, such as talc, silica, silicate clays, and starch powders, as long as the add-on weight of the entire elastomer composition (including the topcoat) does not exceed about 10.0 ounces per square yard (and preferably exists at a much lower level, about 1.5, for instance).

Two other tests which the specific coated airbag cushion must pass are the oven (heat) aging and humidity aging tests. Such tests also simulate the storage of an airbag fabric over a long period of time upon exposure at high temperatures and at relatively high humidities. These tests are actually used to analyze alterations of various different fabric properties after such a prolonged storage in a hot ventilated oven (>100° C.) (with or without humid conditions) for 2 or more weeks. For the purposes of this invention, this test was used basically to analyze the air permeability of the coated side curtain airbag by measuring the characteristic leak-down time (as discussed above, in detail). The initially produced and stored inventive airbag cushion should exhibit a characteristic leak-down time of greater than about 5 seconds (upon re-inflation at 10 psi gas pressure after the bag had previously been inflated to a peak pressure above about 15 psi and allowed to fully deflate) under such harsh storage conditions. Since polyurethanes, the preferred elastomers in this invention, may be deleteriously affected by high heat and humidity (though not as deleteriously as certain polyester and polyether-containing elastomers), it may be prudent to add certain components within a topcoat layer and/or within the elastomer itself. Antioxidants, antidegradants, and metal deactivators may be utilized for this purpose. Examples include, and are not intended to be limited to, Irganox® 1010 and Irganox® 565, both available from CIBA Specialty Chemicals. This topcoat may also provide additional protection against aging and thus may include topcoat aging improvement materials, such as, and not limited to, polyamides, NBR rubbers, EPDM rubbers, and the like, as long as the elastomer composition (including the topcoat) does not exceed the about 10.0 ounces per square yard (preferably much less than that, about 2-4) of the add-on weight to the target fabric.

The substrate to which the thin film coatings are applied to form the airbag base fabric in accordance with at least one embodiment of the present invention is preferably a woven fabric formed from yarns comprising synthetic fibers, such as polyamides or polyesters. Such yarn preferably has a linear density of about 105 denier to about 840 denier, more preferably from about 210 to about 630 denier. Such yarns are preferably formed from multiple filaments wherein the filaments have linear densities of about 7 denier per filaments or less, more preferably about 6 dpf or less, and most preferably about 4 dpf or less. In the more preferred embodiment such substrate fabric will be formed from fibers of nylon, and most preferred is nylon 6,6. It has been found that such polyamide materials exhibit particularly good adhesion and maintenance of resistance to hydrolysis when used in combination with the coating according to the present invention. Such substrate fabrics are preferably woven using fluid jet weaving machines as disclosed in U.S. Pat. Nos. 5,503,197 and 5,421,378 to Bower et al. (incorporated herein by reference). Such woven fabric will be hereinafter referred to as an airbag base fabric. As noted above, when the inventive airbag is a side curtain airbag, it must exhibit extremely low permeability. As noted previously and extensively, such side curtain airbags (a.k.a., cushions) must retain a large amount of inflation gas during a collision in order to accord proper long-duration cushioning protection to passengers during rollover accidents. Any standard side curtain airbag may be utilized in combination with the inventive coatings, films, fabrics, layers, and/or the like to provide a product which exhibits the desired characteristic leak-down times as noted above. Most side curtain airbags are produced through labor-intensive sewing or stitching (or other manner) together two separate woven fabric blanks to form an inflatable structure. Furthermore, as is well understood by the ordinarily skilled artisan, such sewing, etc., is performed in strategic locations to form seams (connection points between fabric layers) which in turn produce discrete open areas into which inflation gasses may flow during inflation. Such open areas thus produce pillowed structures within the final inflated airbag cushion to provide more surface area during a collision, as well as provide strength to the bag itself in order to withstand the very high initial inflation pressures (and thus not explode during such an inflation event).

Other side curtain airbag cushions exist which are of the one-piece woven variety. Basically, some inflatable airbags are produced through the simultaneous weaving of two separate layers of fabric which are joined together at certain strategic locations (again, to form the desired pillowed structures). Such cushions thus present seams of connection between the two layers. It is the presence of so many seams (in both multiple-piece and one-piece woven bags) which create the aforementioned problems of gas loss during and after inflation. The possibility of yarn shifting, particularly where the yarns shift in and at many different ways and amounts, thus creates the quick deflation of the bag through quick escaping of inflation gasses. Thus, the base airbag fabrics do not provide much help in reducing permeability (and correlated characteristic leak-down times, particularly at relatively high pressures). It is this seam problem which has primarily created the need for the utilization of very thick, and thus expensive, coatings to provide necessarily low permeability in the past.

Recently, a move has been made away from both the multiple-piece side curtain airbags (which require great amounts of labor-intensive sewing to attached woven fabric blanks) and the traditionally produced one-piece woven cushions, to more specific one-piece woven fabrics which exhibit substantially reduced floats between woven yarns to substantially reduce the unbalanced shifting of yarns upon inflation, such as described in U.S. Pat. No. 6,220,309, hereby completely incorporated by reference herein. These one-piece woven bags are generally produced on dobby or jacquard fluid-jet looms, preferably the utilized one-piece airbag is made from a jacquard weaving process. With such an improvement, the possibility of high leakage at seams is substantially reduced. These airbags provide balanced weave constructions at and around attachment points between two layers of fabrics such that the ability of the yarns to become displaced upon inflation at high pressures is reduced as compared with the standard one-piece woven airbags. Such inventive one-piece woven bags may still be problematic in that the weave intersections may be displaced upon high pressure inflation such that leakage may occur at too high a rate for proper functioning. As a result, there is usually still a need to coat such one-piece woven structures with materials which reduce and/or eliminate such an effect. However, such one-piece woven structures permit extremely low add-on amounts of elastomeric coatings for low permeability effects. In fact, these inventive airbags function extremely well with low add-on coatings below about 1.5 and as low as about 0.8 ounces per square yard.

As described in U. S. Pat. No. 6,220,309, inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events usually occurs within about 100 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop; U.S. Pat. No. 5,454,594 to Krickl; U.S. Pat. No. 5,423,273 to Hawthorn et al.; U.S. Pat. No. 5,316,337 to Yamaji, et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower et al.; and U.S. Pat. No. 5,704,402 to Bowen et al. A two-weave construction airbag cushion is exemplified in U.S. Pat. No. 5,651,395 to Graham et al. but does not discuss the importance of narrow basket-weave single fabric layers.

As will be appreciated, the permeability of an airbag cushion structure is an important factor in determining the rate of inflation and subsequent rapid deflation following the impact event. Different airbag cushions are utilized for different purposes. For instance, some airbag cushions are installed within inflation modules for driver protection within the steering column of an automobile. Others are utilized as protection for front seat passengers and are installed in and around the glove compartment and/or on the dashboard in front of such a passenger seat. Still others have been developed in an effort to protect all passengers during a long-duration impact event, such as, for example, a rollover collision. In those types of crashes, the target airbag cushion must inflate quickly under high pressure (such as between about 10 and 40 psi) and remain inflated at a relatively high pressures in order to provide the greatest degree of protection to such passengers.

Furthermore, such long-duration airbag cushions preferably comprise "pillow" formations created through the attachment of at least two different fabrics or fabric ends together and sealed, sewn, or the like, together. Upon inflation the free space between the attachment points inflate as well, thereby producing the desired cushioned "pillow" structures. Such long-duration, "pillowed" structures have been disclosed in the prior art as airbag cushions within U.S. Pat. No. 5,788,270 to Halano. However, in order to provide a suitable, effective airbag fabric and cushion comprising two or more points of attachment between fabrics or fabric ends, there has been a need to improve upon the structural integrity of the seams at such attachment points to prevent unwanted and potentially harmful leakage of gas or air from within the target airbag cushion. The prior art has discussed the development of coatings to place over the sewn seams at such attachment points in order to seal the potentially loose portions of such seams and/or to keep the individual yarns of the airbag fabrics at the attachment points stationary in order to prevent yarn shifting and thus possible openings for air or gas leakage. However, such coatings are actually supplemental to the seam structures in providing the necessary barrier to air or gas. A strong, effective, efficient weave construction is the primary method of initially producing an effective airbag fabric for incorporation within an airbag cushion.

Previous attempts have been made at producing inflatable fabrics comprising "pillowed" chambers (such as for side curtains, and the like) which have been produced solely through a weaving procedure and which exhibit reduced air permeability within their weave constructions (in other words, fabrics which are not sewn together to form an inflatable structure). For instance, U.S. Pat. No. 5,011,183 to Thornton et al. discloses an inflatable fabric structure comprising at least two different areas of differing fabric layers. Patentees discuss two layers of fabric produced by a plain weave and single layer constructions of a plurality of different weave patterns. The interface between the two different fabric layer areas must exhibit at least three different fabric densities (which are dictated by weave constructions), wherein the two looser constructions (double layer plain weave and single layer basket weave) are separated by a tighter construction (single layer plain weave). Such an overall inflatable fabric structure may possess the necessary air permeability characteristics required for proper functioning within a side curtain airbag cushion (particularly upon coating with a standard airbag coating composition); however, the numerous differences in fabric densities also place varying pressures upon discrete areas of the fabric (particularly at or near the interface between the differing fabric layer areas) such that yarn shifting will most likely occur during an inflation event which may produce discontinuities in the integrity of the coating which may in turn compromise the long-term air permeability required for certain airbag applications.

Attempts have been made at improving on such a fabric; however these have led to an increase in the number of different fabric density areas on the fabric, rather than reducing such differing densities. For example, a plain weave construction has been utilized within the double layer area, adjacent to a transition weave pattern, which connects with an Oxford weave pattern, and then either a basket-weave or plain weave construction for the remainder of the single layer area on the fabric. Such a complicated scheme is difficult to produce on a weaving apparatus, as an initial problem. Secondly, the utilization of an Oxford weave zone has been utilized in an attempt to prevent the possibility of weaving in a plain pattern (which is highly undesirable due to the difficulty in manufacturing such high density single-layers fabrics from double-layer amounts of yarn). However, if the area of single layer of fabric is not substantially a straight line, and thus must follow a curved structure, the Oxford weave will eventually become a plain weave for at least that area around such a curved seam. In such an instance, the interface between the two differing layers of fabric will be irregular and invariably produce an undesirable and/or irregular number of floats (i.e., yarns which pass either over or under a certain number of perpendicularly oriented yarns; greater than three such oriented yarns would produce difficulties in preventing yarn shifting, as merely one example). As such, the resultant fabric is itself highly undesirable as a barrier to air permeability, even though coatings may be applied to increase such performance. Thirdly, the individual yarns at the seam between the double and single layer areas, will be placed upon tremendous strain during an inflation event and, as in the Thornton et al. teaching, will most likely result in yarn shifting. With such shifting yarns, the permeability benefits, if any, would, again, most likely be compromised and the produced airbag fabric would not function as required.

In view of the foregoing, it is preferred to provide an inflatable all-woven fabric having all-basket-woven seams at the single/double layer interfaces within the fabric. It is even more preferred to provide an all-woven inflatable fabric with double layer zones of fabric and single layer zones of fabric (to form "pillowed" chambers) which comprises at most two different fabric densities throughout the entire fabric structure. Also, an object of this invention is for the utilization of such inflatable fabrics as airbag cushions within a vehicle restraint system. The term "vehicle restraint system" is intended to mean both inflatable occupant restraining cushion and the mechanical and chemical components (such as the inflation means, ignition means, propellant, and the like).

To achieve these and other objects and in accordance with the purpose of the invention, as embodied and broadly described herein, at least one embodiment of the invention provides an inflatable fabric comprising at least two layers of fabric in certain discrete areas of the fabric and at least one single fabric layer at a discrete area within said fabric, wherein said at least one single fabric layer is formed, for example, from a basket weave pattern of an even number of yarns; preferably, the weave structure for said single layer fabrics is a 2×2 basket weave pattern, for example, from 4 to 8 yarns in length. Also, this invention encompasses an inflatable fabric comprising at least two layers of fabric in certain discrete areas of the fabric and at least one single fabric layer at a discrete area within said fabric, wherein the weave diagram for such a fabric does not exhibit more than three consecutive filled or unfilled blocks in any row or column. Furthermore, this invention also concerns an inflatable fabric comprising at least two layers of fabric in certain discrete areas of the fabric and at least one single fabric layer at a discrete area within said fabric, wherein only two separate weave densities are present within the entire fabric structure.

The term "inflatable fabric" is intended to encompass any fabric which is constructed of at least two layers of fabric which can be sealed to form a bag article. The inventive inflatable fabric thus must include double layers of fabric to permit such inflation, as well as single layers of fabric either to act as a seal at the ends of such fabric panels, or to provide "pillowed" chambers within the target fabric upon inflation. The term "all-woven" as it pertains to the inventive fabric thus requires that the inflatable fabric having double and single layers of fabric be produced solely upon a loom. Any type of loom may be utilized for this purpose, such as water-jet, air-jet, rapier, dobby, and the like. Jacquard weaving and dobby weaving, however, are most preferred.

The constructed fabric may exhibit balanced or unbalanced pick/end counts; the main requirement in the woven construction is that the single layer areas of the inflatable fabric exhibit solely basket-weave patterns. These patterns are made through the arrangement of at least one warp yarn (or weft yarn) configured around the same side of two adjacent weft yarns (or warp yarns) within the weave pattern. The resultant pattern appears as a "basket" upon the arrangement of the same warp (or weft) yarn to the opposite side of the next adjacent weft (or warp) yarn. Such basket weave patterns may include the arrangement of a warp (or weft) yarn around the same side of any even number of weft (or warp) yarns, preferably up to about six at any one time.

The utilization of such basket weave patterns in the single layer zones provides a number of heretofore unexplored benefits within inflatable fabric structures. For example, such basket weave patterns permit a constant "seam" width and weave construction over an entire single layer area, even where the area is curved. As noted above, the standard Oxford weaves currently utilized cannot remain as the same weave pattern around curved seams; they become plain weave patterns. Also, such basket weave seam patterns permit the construction of an inflatable fabric having only plain woven double layer fabric areas and single layer "seams" with no "floats" of greater than three picks within the entire fabric structure. Such a fabric would thus not possess discrete locations where the air permeability is substantially greater than the remaining portions of the fabric. Generally, the prior art (such as Thornton et al., supra) produce floats of sometimes as much as six or seven picks at a time. Although available software to the weaving industry permits "filling in" of such floats within weave diagrams, such a procedure takes time and still does not continuously provide a fabric exhibiting substantially balanced air permeability characteristics over the entire structure. The basket-weave formations within the single fabric layers thus must be positioned in the fabric so as to prevent irregularities (large numbers of floats, for example) in the weave construction at the interface between the single and double fabric layers (as described in FIG. 10, below). Another benefit such basket weave patterns accord the user is the ability to produce more than one area of single layer fabric (i.e., another "seam" within the fabric) adjacent to the first "seam." Such a second seam provides a manner of dissipating the pressure from or transferring the load upon each individual yarn within both seams. Such a benefit thus reduces the chances of deleterious yarn shifting during an inflation event through the utilization of strictly a woven fabric construction (i.e., not necessarily relying upon the utilization of a coating as well). The previously disclosed or utilized inflatable fabrics having both double and single fabric layer areas have not explored such a possibility in utilizing two basket-weave pattern seams. Furthermore, such a two-seam construction eliminates the need for weaving a large single fabric layer area within the target inflatable fabric. The prior art fabrics which produce "pillowed" chambers for airbag cushions (such as side curtains), have been formed through the weaving of entire areas of single fabric layers (which are not actually seams themselves). Such a procedure is time-consuming and rather difficult to perform. The inventive inflatable fabric merely requires, this alternative embodiment, at least two very narrow single fabric layer areas (seams) woven into the fabric structure (another preferred embodiment utilizes merely one seam of single layer fabric); the remainder of the fabric located within these two areas may be double layer if desired. Thus, the inventive fabric permits an improved, cost-effective, method of making a "pillowed" inflatable fabric.

The inflatable fabric itself is preferably produced from all-synthetic fibers, such as polyesters and polyamides, although natural fibers may also be utilized in certain circumstances. Preferably, the fabric is constructed of nylon-6,6. The individual yarns utilized within the fabric substrate must generally possess deniers within the range of from about 40 to about 840; preferably from about 100 to about 630.

As noted above, coatings should be applied to the surface as a necessary supplement to the air permeability, abrasion resistance and/or puncture resistance of the inventive fabric. Since one preferred ultimate use of this inventive fabric is as a side curtain airbag which must maintain a very low degree of air permeability throughout a collision event (such as a rollover where the curtain must protect passengers for an appreciable amount of time), a decrease in permitted air permeability is highly desirable. Any standard coating, such as a silicone, polyurethane, polyamide, polyester, rubber (such as neoprene, for example), and the like, may be utilized for this purpose and may be applied in any standard method and in any standard amount on the fabric surface.

Furthermore, although it is not preferred, it has been found that the inventive coating composition provides similar low permeability benefits to standard one-piece woven airbags, particularly with the inventive add-on amounts of high tensile strength, high elongation, non-silicone coatings; however, the amount of coating required to permit high characteristic leakdown times is much higher than for the aforementioned Sollars, Jr. inventive one-piece woven structure. Thus, add-on amounts of as much as 1.5 or more ounces per square yard may be necessary to effectuate the proper low level of air permeability for these other one-piece woven airbags. Even with such higher add-on coatings, the inventive coatings themselves clearly provide a marked improvement over the standard, commercial, less preferred silicone, etc., coatings (which must be present in amounts of at least 3.0 ounces per square yard).

Additionally, it has also been found that the inventive film coating compositions, at the inventive add-on amounts, etc., provide the same types of benefits with the aforementioned sewn, stitched, etc., side curtain airbags. Although such structures are highly undesirable due to the high potential for leakage at these attachment seams, it has been found that the inventive coating provides a substantial reduction in permeability (to acceptable characteristic leak-down time levels, in fact) with correlative lower add-on amounts than with standard silicone and neoprene rubber coating formulations. Such add-on amounts may approach about 2.7 ounces per square yard or more, but lower amounts have proven effective (2.2 ounces per square yard, for example) depending on the utilization of a sufficiently high tensile strength and sufficiently stretchable elastomeric component within the film coating composition directly in contact with the target fabric surface. Again, with the ability to reduce the amount of coating materials (which are generally always quite expensive), while simultaneously providing a substantial reduction in permeability to the target airbag structure, as well as high resistance to humidity and extremely effective aging stability, the inventive coating composition, and the inventive coated airbag itself is clearly a vast improvement over the prior airbag coating art.

Another aspect of this invention, is the ability to pack the coated airbag cushions within cylindrical storage containers at the roof line of a target automobile in as small a volume as possible. In a rolled configuration (in order to best fit within the cylindrical container itself, and thus in order to best inflate upon a collision event downward to accord the passengers sufficient protection), the inventive airbag may be constricted to a cylindrical shape having a diameter of about 24 millimeters or more. In such an instance, with a 2 meter long cylindrical roofline storage container, the necessary volume of such a container would equal about 855 cm$^3$ or more (with the volume calculated as 2[Pi]radius$^2$). Standard rolled packing diameters are at least 25 millimeters for commercially available side curtain airbag cushions (due to the thickness of the required coating to provide low permeability characteristics). Thus, the required cylindrical container volume would be at least 980 cm$^3$. Preferably, the rolled diameter of the inventive airbag cushion during storage is about 21 millimeters or more (giving a packed volume of about 647 cm$^3$ or more). In relation, then, to the depth of the airbag cushion upon inflation (i.e., the length the airbag extends from the roofline down to its lowest point along the side of the target automobile, such as at the windows), the quotient of the inventive airbag cushion's depth (which is standard at approximately 17 inches or 431.8 millimeters) to its rolled packed diameter should be at least about 18.0 or less. Of course, this range of quotients does not require the depth to be at a standard of 17 inches, and is primarily a function of coating thickness, and thus add-on weight.

Also, it has been discovered that any film and/or coating with a tensile strength of at least 2,000 psi and an elongation at break of at least 180% coated onto and over both sides of a side curtain airbag fabric surface at a weight of at most about 10.0 ounces per square yard, and preferably below about 7.0, more preferably below about 6.0, and most preferably less than about 5.0 ounces per square yard, provides a coated airbag cushion which exhibits extremely low and extended permeability upon and after inflation. This unexpectedly beneficial type and amount of film coating thus provides an airbag cushion which will easily inflate after prolonged storage and will remain inflated for a sufficient amount of time to ensure an optimum level of safety within a restraint system. Furthermore, it goes without saying that the less film coating composition required, the less expensive the final product. Additionally, a lower required amount of film coating composition will translate into a decrease in the packing volume of the airbag fabric within an airbag device. This benefit thus improves the packability for the airbag fabric.

One preferred airbag cushion of this invention was produced in accordance with the following Example:

EXAMPLE

First, an adhesive primer formulation was produced having the composition:

| Component | Parts by weight |
|---|---|
| Desmoderm ® 43195 (Bayer Corporaiton, polyurethane resin) | 25 grams |
| Dimethylformamide (Aldrich, solvent) | 75 grams |
| Desmodur ® CB-75N (Bayer, polyisocyanate adhesion promoter) | 4 grams |

This primer coating was applied to both sides of a 2.5 liter size Jacquard woven nylon airbag (of 440 denier fibers), made in accordance with the Figures and preferred embodiments within U.S. patent application Ser. No. 09/406,264, to Sollars, Jr., previously incorporated by reference. The primer coating was dried at about 160° C. for about 2 minutes to obtain a dry coating weight of about 0.25 ounces per square yard on each side. Subsequently, a 2 mil thick polyurethane film (Dureflex™ PT9400) was then laminated on both sides of the primer coated airbag utilizing a hotpress providing about 80 psi press pressure at about 188° C. with a residence time of about 1 minute. The total polyurethane film add-on weight on each side of the airbag was about 2.2 ounces per square yard. The airbag was then rapidly inflated to 30 psi air pressure. More than 28 seconds elapsed before the air pressure leaked down to 8 psi. The leakage rate was thus measured at 10 psi to be about 4 SCFH. The characteristic leak-down time was an astounding amount, greater than 80 seconds.

As depicted in FIG. 1, an interior of a vehicle 10 prior to inflation of a side curtain airbag is shown. The vehicle 10 includes a front seat 12 and a back seat 14, a front side window 16 and a back-side window 18, a roofline 20, within which is stored a cylindrically shaped container 22 housing the inventive side curtain airbag 26. Also present within the roofline 20 is an inflator assembly 24 which ignites and forces gas into the side curtain airbag 26 upon a collision event.

FIG. 2 shows the inflated side curtain airbag 26. As noted above, the airbag 26 may be coated with a coating formulation and/or film, preferably polyurethane polycarbonate. The inventive airbag 26 will preferably remain sufficiently inflated for at least 5 seconds, and preferably as high as at least 20 seconds.

FIG. 3 shows the side curtain airbag 26 prior to or after storage in its uninflated state within the roofline cylindrically shaped container 22. The thickness of the airbag 26, measured as the rolled packing diameter (as in FIG. 5, below) as compared with the depth of the airbag measured from the roofline cylindrically shaped container 22 to the bottom most point 28 of the airbag 26 either in its uninflated or inflated state should preferably be at least 17 and at most 29, as noted above.

FIGS. 4 and 5A aid in understanding this concept through the viewing of the rolled airbag 26 as stored within the container 22 along line 5-5. The diameter measurement of the airbag 26 of the example above, is roughly 24 millimeters 9 or more. The standard depth of side curtain airbags is roughly 17 inches, or about 431.8 millimeters.

FIGS. 3 and 6 show the respective interior and exterior surfaces 102, 104 of the airbag 26.

FIG. 5A shows the airbag 26 being rolled. Alternatively, FIG. 5B shows the airbag 26 being folded. The airbag 26 may be rolled or folded and packed into a cylindrical woven or molded tube, or the airbag 26 may be folded and held in position by straps such as breakaway molded plastic straps.

With reference to FIGS. 7-9 of the drawings, and in accordance with selected embodiments of the present invention providing abrasion resistant fabrics and/or airbag cushions, resistance to abrasion by gravel (FIG. 7) was tested by using road side gravel placed on a test board, inflating a test bag to 10 psi, placing the test board on the inflated bag with the gravel toward the bag and loading the test board with a 13 lbs. concrete block, scrubbing the gravel board across the bag at one cycle per second, and measuring the gas flow rate required to maintain bag pressure at 10 psi. As shown in FIG. 7 of the drawings, a bag in accordance with the present invention (test bag) had an extremely high resistance to abrasion by gravel in that the pressure required to maintain bag pressure at 10 psi increased only slightly during the initial phase of the testing and then remained relatively constant from about 20 to 100 cycles. In contrast to the test bag of the present invention, the base line bag showed a steady increase from 0 to 20 cycles and then a drastic increase in pressure to maintain bag pressure at 10 psi from 20 to about 25 cycles.

The test bag was a jacquard woven airbag made of 420 denier high tenacity nylon, coated with 1.2 oz/yd$^2$ polyurethane on each side, and a 3 mil thick Duraflex PT 9400 polyurethane film was laminated on one side of the bag (FIG. 12B).

The baseline bag was a jacquard woven airbag made from 420 denier high tenacity nylon coated with 4 oz/yd$^2$ of silicone on each side of the bag.

With reference to FIG. 8 the drawings and resistance to abrasion by concrete, testing of a test bag in accordance with the present invention entailed using a concrete block as the test media, inflating a test bag to 10 psi, placing a concrete block on the inflated bag (about 13 lbs.), scrubbing the concrete block back and forth across the bag at one cycle per second and measuring the flow rate required to maintain bag pressure at 10 psi. As shown in FIG. 8 of the drawings, the test bag of the present invention showed a high resistance to abrasion by concrete and had a very low and constant leak rate from 0 to 100 cycles. In contrast to the test bag of the present invention, the base line bag had a higher leak rate which increased from 0 to about 12 cycles and drastically increased from about 12 to 20 cycles.

The test bag was a jacquard woven airbag made of 420 denier high tenacity nylon, coated with 1.2 oz/yd$^2$ polyurethane on each side, and with a 3 mil thick Duraflex PT 9400 polyurethane film was laminated on one side of the bag (FIG. 12B).

The baseline bag was a jacquard woven airbag made from 420 denier high tenacity nylon coated with 4 oz/yd$^2$ of silicone on each side of the bag.

With reference to FIG. 9 of a drawing, the test bag of the present invention showed a very high resistance to puncture as compared to a baseline bag. Testing of the test bag of the present invention for puncture included placing shards of vehicle side window glass on a plate, deploying the test bag to 30 psi against the plate covered with the broken glass, dropping a 25 pound weight on the bag as the bag reached full inflation to force the inflated bag to impact the broken glass, and measuring the time for the pressure to fall from 30 psi to 15 psi (time to lose half of full pressure). As shown in FIG. 9 of the drawings, the test bag of the present invention took at least about 5 seconds to lose half of its pressure to drop from (30 psi to 15 psi). In contrast, the base line bag took less than one half of a second.

The test bag was a jacquard woven airbag made of 420 denier high tenacity nylon, coated with 1.2 oz/yd$^2$ polyurethane on each side, with a 3 mil thick Duraflex PT 9400 polyurethane film laminated on one side of the bag, and with a layer of lightweight polyester airbag fabric over the film (FIG. 12D).

The baseline bag was a jacquard woven airbag made from 420 denier high tenacity nylon coated with 4 oz/yd$^2$ of silicone on each side of the bag.

Hence, the test bags of the present invention showed an unexpectedly high resistance to abrasion by gravel, unexpectedly high resistance to abrasion by concrete, and an unexpectedly high resistance to puncture. Such features find special applicability in a side curtain airbag which is to provide rollover protection.

Turning now to FIGS. 10 and 11 of the drawings, in FIG. 10 there is shown a cross-section of a preferred structure for the double fabric layers 52, 54, 58, 60, 64, 66 and single fabric layers 56, 62 of the inventive inflatable fabric 50. Weft yarns 68 are present in each of these fabric layer areas 52, 54, 56, 58, 60, 62, 64, 66 over and under which individual warp yarns 78, 80, 82, 84 have been woven. The double fabric layers 52, 54, 58, 60, 64, 66 are woven in plain weave patterns. The single fabric layers 56, 62 are woven in basket weave patterns. Four weft yarns each are configured through each repeating basket weave pattern within this preferred structure; however, two or more weft yarns may be utilized within these single fabric layer areas (seams) 56, 62. The intermediate double fabric layer areas 58, 60 comprise each only four weft yarns 68 within plain weave patterns. The number of such intermediate weft yarns 68 between the single fabric layer areas 56, 62 must be in multiples of two to provide the maximum pressure bearing benefits within the two seams 56, 62 and thus the lowest possibility of yarn shifting during inflation at the interfaces of the seams 56, 62 with the double fabric layer areas 52, 54, 64, 66.

FIG. 11 shows the weave diagram 70 for an inventive fabric which comprises two irregularly shapes concentric circles as the seams. Such a diagram also provides a general explanation as to the necessary selection criteria of placement of basket-weave patterns within the fabric itself. Three different types of patterns are noted on the diagram by different shades. The first 72 indicates the repeated plain weave pattern throughout the double fabric layers (52, 54, 58, 60, 64, 66 of FIG. 10, for example) which must always initiate at a location in the warp direction of 4X+1, with X representing the number of pick arrangement within the diagram, and at a location in the fill direction of 4X+1 (thus, the pick arrangement including the specific two-layer plain-weave-signifying-block 72 begins at the block four spaces below it in both directions). The second 74 indicates an "up-down" basket weave pattern wherein an empty block must exist and always initiate the basket-weave pattern at a location in the warp direction of 4X+1, with X representing the number of repeating pick arrangements within the diagram, and at a location in the fill direction of 4X+1, when a seam (such as 56 and 62 in FIG. 10) is desired (thus, the pattern including the pertinent signifying "up-down" block 74 includes an empty block within the basket-weave pick arrangement in both the warp and fill directions four spaces below it). The remaining pattern, which is basically a "down-up" basket weave pattern to a single fabric layer (such as 56 and 62 in FIG. 10) is indicated by a specifically shaded block 76. Such a pattern must always initiate at a location in the warp direction of 4X+1 and fill of 4X+3, or warp of 4X+3 and fill of 4X+1, when a seam is desired. Such a specific arrangement of differing "up-down" basket weave 74 and "down-up" basket weave 76 pattern is necessary to effectuate the continuous and repeated weave construction wherein no more than three floats (i.e., empty blocks) are present simultaneously within the target fabric structure. Furthermore, again, it is believed that there has been no such disclosure or exploration of such a concept within the inflatable fabric art.

With reference to FIGS. 3 and 6, the side curtain airbag or cushion 26 has an interior surface 102 (close to the occupant) and an exterior surface 104 facing the window or windows. With reference to FIG. 10, a thick coating, layer, film, or the like 86 represents the exterior surface (window side) of the airbag 50 while a thinner coating, film, layer, or the like 88 represents the interior surface (occupant side) of the airbag.

A side curtain type of air bag acts as a safety barrier between the occupant of a vehicle and hazards outside of the vehicle in a collision. Puncture resistance is preferred to prevent premature leak-down and possible bag rupture due to impact on sharp objects such as broken window glass, nails, splintered wood, rocks and gravel with sharp edges, broken plastic or torn metal generated in a vehicle crash. Bag puncture may result in loss of bag gas pressure necessary to provide the cushioning and energy absorbing function of the air bag, and therefore loss of safety provided by the air bag.

The side curtain air bag may get between the occupant and another vehicle or other outside object such as a utility pole in a side impact accident. The air bag may also hit the ground and other objects on the ground in a rollover type of collision. Side impact air bags, especially rollover protection curtain type air bags are designed to protect the occupants in those types of accidents.

Side impact air bags are usually made of coated fabric to provide quick inflation (20-40 ms) to operating pressure for a relatively longer time compared to a typical driver side air bag. For rollover protection, the air bag needs to stay inflated at relatively high pressure for an extended period of time (several seconds). Even a small puncture in the coating by a small sharp object can greatly lower the gas pressure in the bag and sacrifice the bag performance. There are also situations where part of the bag can hit against one or more small sharp objects. Due to great bag pressure and such a small contact area, the fabric may get cut through, and even cause the bag to burst on impact.

We have experimented with many fabric designs and fabric combinations and found a surprising correlation between the air bag puncture resistance under simulated crash conditions and two different ASTM standard puncture resistance tests. We have also found that certain fabric structures and treatments provide unexpectedly good puncture resistance.

We have constructed different fabric structures for the side curtain airbag and experimented with the bag performance in puncture resistance tests. Compared to current air bag constructions, we have demonstrated great improvement in puncture resistance. Additionally, we have found that a combination of two ASTM tests can provide a good correlation to puncture under simulated crash conditions.

A test was devised to study side impact bag performance under simulated crash conditions. Two plates that simulate the sharp objects typically encountered in an automotive accident were constructed (a glass plate and a gravel plate). On the glass plate, pieces of broken glass from a car side window were fixed on a flat thick plywood surface using epoxy resin. On the gravel plate, road construction gravel having stones with relatively sharp edges was fixed onto a thick plywood surface using asphalt. In the test, a plate is horizontally fixed on a stable platform. A side curtain type air bag positioned a couple of inches above the plate is inflated at a fast rate (about 30 ms to its peak pressure). Immediately after inflation, a 25 lb. weight is dropped from a 5½ feet height onto the top side of the air bag. The dropped weight thus pushes the fully inflated airbag down against the plate with the sharp objects. The gas pressure inside the air bag is monitored and the rate of pressure decay reflects the damage to the bag. As the rate of pressure decay is approximately exponential, the "half life"—the time for the pressure to drop to one half its initial pressure—is a simple measure of the degree of damage to the bag. Tested bags were also examined to determine the failure mode, namely, number of small punctures and large holes. Small punctures are those that result in gas leakage due to a break in the coating with 2 or fewer yarn breaks. Large holes are those that involve multiple yarn breaks, cuts, or localized burst or tear.

F One layer of uncoated 78 denier 96×96 polyester fabric was loosely sewn on the outside edges of air bag C, the uncoated fabric faced the broken glass plate;

G One layer of uncoated 78 denier 96×96 polyester fabric laminated to one side of air bag C using a polyurethane elastomer, the laminated fabric faced the broken glass plate;

H One layer of uncoated 630 denier 40×40 airbag fabric was loosely sewn on the outside edges of air bag C, the uncoated 630 denier fabric faced the broken glass plate;

I One layer of uncoated 630 denier 40×40 airbag fabric was laminated to one side of air bag C using a polyurethane elastomer, and the laminated side faced to the broken glass plate;

J One layer of uncoated 100 denier 110×110 airbag fabric was loosely sewn on the outside edges of air bag C, the uncoated 100 denier fabric faced the broken glass plate;

TABLE I

Test results of impact drop test of bags A-K on broken glass plate using inflation simulator.

| Bag struct. | Silicone coating - 1 A | Silicone coating with nonwoven B | Polyurethane coated C | 420d sewn D | 420d laminate E | S/1125 sewn F | S/1125 laminate G |
|---|---|---|---|---|---|---|---|
| Half Life Sec | | <0.3 | 0.3 | 0.3-2 | 5 | 0.5 | 5 |
| Big holes | 22 | 16 | 9 | 3 | 0 | 3 | 1 |
| Small holes | 4 | 2 | 5 | 2 | 2 | 4 | 2 |

| Bag struct. | 630d sewn H | 630d laminate I | 100d sewn J | 100d laminate K | |
|---|---|---|---|---|---|
| Half Life Sec | — | 18 | 0.7 | 10 | |
| Big holes | 0 | 0 | 2 | 0 | 0 |
| Small holes | 1 | 0 | 1 | 1 | |
| Scratches Other observ. | 0 | | | | |

Fabric Structures:

A 420 denier woven Jacquard side curtain air bag coated with 2.5 oz/yd² high consistency silicone rubber on each side;

B 420 denier woven Jacquard side curtain air bag coated with about 3 oz/yd² silicone rubber with a thin layer of non-woven fabric laminated to the top of the coating on each side;

C 420 denier woven Jacquard side curtain air bag coated with about 1.0 oz/yd² polyurethane on each side;

D One layer of uncoated 420 denier 49×49 airbag fabric was loosely sewn on the outside edges of air bag C, the uncoated 420 denier fabric faced the broken glass plate;

E One layer of uncoated 420 denier 49×49 airbag fabric was laminated to one side of air bag C using a polyurethane elastomer, and the laminated side faced to the broken glass plate;

K One layer of uncoated 100 denier 110×110 airbag fabric was laminated to one side of air bag C using a polyurethane elastomer, and the laminated side faced to the broken glass plate.

Big holes: holes that have fabric tear and/or multiple yarn cut or bursting, contribute to rapid leak down and major failure.

Small holes: small pin holes that do not have any fabric tear or have only 1 or 2 broken yarns. Relatively small amount of air leaks through the small pin holes.

Half Life: time in sec. required for pressure in bag to drop by ½ of the peak pressure.

ASTM F 1342 "Standard Test Method for Protective Clothing Material Resistance to Puncture" provides a good measure regarding how easily a sharp object can penetrate a fabric structure. ASTM D 4833 "Standard Test Method for Index Puncture Resistance of Geotextiles, Membranes, and Related Products" provides a good measure of how easily a fabric would burst at high stress concentration on a small contact area. We have found that ASTM F 1342 test method gives a good indication of fabric resistance to initial penetration by a sharp object and that ASTM D 4833 test method relates largely to the resistance to local bursting and tear.

ASTM D 4833—Standard Test Method for Index Puncture Resistance of Geotextiles, Geomembranes and Related Products.

A text specimen is clamped without tension between circular plates of a ring clamp attachment secured in a tensile testing machine. A force is exerted against the center of the unsupported portion of the test specimen by a solid steel rod attached to the load indicator until rupture of the specimen occurs. The maximum force recorded is the value of puncture resistance of the specimen.

ASTM F 1342—Standard Test Method for Protective Clothing Material Resistance to Puncture.

A material specimen is placed in a stationary support assembly that is in turn affixed to the lower arm of a tensile testing machine. A sharp puncture probe of set dimension is moved at a constant velocity until the material specimen is punctured. The force required to puncture the material specimen is measured by the compression cell and the average force is reported as the measure of resistance to puncture.

TABLE II

Test results:

A. Uncoated single layer fabric

| Fabric | 420 denier, 49 × 49 (420d) | 630 denier, 40 × 40 (630d) | Polyester, 78 denier 96 × 96 (PET78) | 100 denier 110 × 110 (100d) | Spun laced non-woven fabric |
|---|---|---|---|---|---|
| ASTM Puncture force (LB) | 2-6 | 6.9 | 3.3 | 9.7 | 1.5 |
| ASTM Index puncture, LB | 174 | 218 | 43.3 | 118 | |

B. Coated fabric, single layer

| Fabric | 420denier, 49 × 49 silicone, LR* coating | 420denier, 494 × 49 polyurethane coating | 420 denier, 47 × 48 Polyamide coating | 630 denier 40 × 40 HC silicon coating | 420 denier, 49 × 49 HC silicone coating |
|---|---|---|---|---|---|
| ASTM Puncture force | 5 | 8 | 6 | 3 | 3 |
| ASTM Index puncture | 151 | 198 | 159 | 153 | 144 |

C. 2 layers structure, uncoated fabric over coated fabric

| Fabric | 420d over polyurethane coated 420d | 420d over silicone coated 420d | 630d over polyurethane coated 420d | S/1125 fabric over polyurethane coated 420d, |
|---|---|---|---|---|
| ASTM Puncture force(LB) | 15.6 | 12 | 18.0 | 11.8 |
| ASTM Index puncture force(LB) | 348 | | 393 | 253 |

D. Laminated 2 layer structures

| Fabric | 420d laminated 420d using polyurethane | Non-woven laminated to a silicone coated 420d fabric | 100d laminated to 420d | 210d laminated to 420d | S/1125 fabric laminated to 420d | 630d laminated to 420d | 2 mil thick polyester film laminated to 420d | Non-woven laminated to 420d using polyurethane |
|---|---|---|---|---|---|---|---|---|
| ASTM puncture force(LB) | 26 | 6.2 | 25 | 21.8 | 16.6 | 26.9 | 8.6 | 13.2 |
| ASTM index puncture force(LB) | 350 | 206 | 325 | 326 | 240 | 385 | | 229 |

LR—liquid rubber resin, HC—high consistency rubber resin

Findings:
1. Current silicone coated airbag fabric does not have good resistance to puncture even when there is a layer of non-woven fabric laminated on top of the coating. High strength and tough coatings, such as polyurethane, provide better resistance to puncture due to polyurethane's better tensile and toughness and silicone's poor resistance to tear and lubricating nature. Coated fabric in general provided better protection than uncoated fabric because the coating links the yarns and fibers together to effectively alleviate stress concentration and to provide better resistance to sharp object's penetration through yarn interstices.
2. One additional layer of fabric provides significant improvement in puncture resistance. Fabric with tighter construction provides better protection because a sharp object is less likely to go through the yarn interstices. Fabric with higher breaking strength also provides better protection against bursting caused by localized high stress such as by impact with small objects.
3. Laminated fabric structures provide surprisingly better puncture resistance than similar structure without lamination.
4. The structure should have enough fabric strength to resist local bursting and tear. However, the structure also should be as thin as possible to provide a small packing volume. The structure also needs to be flexible to allow folding into a small package to fit in a small module.
5. Bag test results had good correlation to the ASTM F 1342 and ASTM D 4833 test results. High index puncture resistance usually has better resistance to local bursting and tear. An index puncture resistance above 210 lbs. seems to be adequate for the application. Index puncture resistance above 250 lbs. is preferred. In addition, and more importantly, ASTM F 1342 puncture force should be above 10 lbs. to provide good resistance to air bag puncture. Puncture force above 15 lbs. is preferred for this application. Above all, we have found that a fabric structure having an ASTM D 4833 index puncture resistance of at least about 210 lbs. and an ASTM F 1342 puncture force of at least about 10 lbs. are preferred for side impact air bags that resist puncture in typical accidents.

With reference to FIG. 12A-12M of the drawings, schematic cross-sectional layer diagrams of selected embodiments of the side wall of an airbag or airbag cushion toward the window are shown. With particular reference, FIG. 12A shows an airbag fabric having a coating on the exterior surface thereof.

FIG. 12B shows a coated airbag fabric having a film laminated or otherwise adhered thereto with the coating between the film and fabric.

FIG. 12C illustrates a coated airbag fabric having an outer fabric layer laminated or otherwise adhered thereto with the coating between the inner and outer fabric layers.

FIG. 12D represents a multi-layered airbag laminate or construction (such as shown in FIG. 12B) including a coated airbag fabric and a film laminated thereto with the addition of an outer fabric layer laminated or otherwise adhered to the film layer of the laminate or composite.

FIG. 12E shows an airbag fabric having a film laminated or adhered thereto.

FIG. 12F shows an airbag fabric having a primer applied thereto and then a coating over the primer.

FIG. 12G shows a multi-layer fabric, laminate or construction including a first airbag fabric laminated or adhered to a second or outer fabric by an adhesive.

FIG. 12H represents a multi-layer airbag fabric, composite or laminate including a first airbag fabric layer, a coating, a second or outer fabric layer, and a coating or film atop the second fabric layer.

FIG. 12I illustrates a multi-layer airbag fabric, composite or laminate including a first layer of airbag fabric having an inner coating or film and an outer coating, primer or adhesive with a coating, fabric or film adhered to the upper surface of the outer coating, primer or adhesive.

FIG. 12J represents a multi-layer airbag fabric, composite, laminate, or the like having an airbag fabric with a coating, primer, or adhesive layer above and below and a film located below the lower coating, primer, or adhesive layer and a coating, fabric or film located above the upper coating, primer, or adhesive layer.

FIG. 12K shows an airbag fabric having a separate film layer located below or adjacent the inner surface of the airbag fabric.

FIG. 12L represents an airbag fabric having a separate barrier layer located above or adjacent to the outer surface of the airbag fabric.

FIG. 12M illustrates an airbag fabric having a coating or film adhered thereto in a fashion producing multiple individual cells or pockets.

FIGS. 12I-12K are directed to, for example, bag-in-bag constructions wherein an inner coating and/or film forms an inflatable cavity in the airbag.

The exact construction of the airbag or side walls thereof of the present invention is not necessarily limited, but is intended to cover all such constructions which provide the desired puncture resistance and/or abrasion resistance as well as other desired properties of the airbag.

The inner or lower fabric layer of FIGS. 12A-12M is preferably woven airbag fabric and more preferably may be jacquard or dobby woven airbag fabric of a woven one piece airbag. The outer or upper fabric layer of FIG. 12C, 12D, 12G, 12H, 12I, 12J, or 12K is preferably woven airbag fabric.

The barrier of FIG. 12L is preferably a material which is puncture and/or abrasion resistant such as a textile material, fabric, or the like.

There are, of course, many alternative embodiments and modifications of the present invention which are intended to be included within the spirit and scope of the following claims. While the invention is described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

What we claim is:
1. An inflatable one piece woven airbag adapted for use between a vehicle occupant and a vehicle in the event of collision, the airbag being a one piece woven construction, the airbag comprising in certain predetermined locations:
    (a) a woven inner fabric layer;
    (b) an intermediate layer, the intermediate layer being comprised in part of a primer or adhesive formulation coating, wherein the primer or adhesive formulation coating contacts and is bonded to at least the woven inner fabric layer; and
    (c) an outer fabric layer upon the intermediate layer.
2. The airbag of claim 1 wherein a film is laminated to the outer fabric layer on the side of the outer fabric layer opposite the intermediate layer.

3. The airbag of claim 1 wherein a film is provided between the primer or adhesive formulation coating and the outer fabric layer.

4. The airbag as recited in claim 2, wherein the film is comprised of a polyurethane.

5. The airbag of claim 1 wherein the outer fabric layer is constructed of one or more materials selected from the following materials: polyester, polyamide, polyolefin, polyurethane.

6. The airbag of claim 2, wherein said film comprises one or more of the following: polyurethane, polyamide, copolymeric material.

7. The airbag of claim 1 wherein the primer or adhesive formulation coating comprises a resin.

8. The airbag of claim 1 wherein the primer or adhesive formulation coating further comprises a polyisocyanate.

9. The airbag of claim 1 wherein the primer or adhesive formulation coating is applied as a liquid, said liquid comprising in part a solvent.

10. The airbag of claim 9, wherein the solvent comprises dimethylformamide.

* * * * *